United States Patent [19]

Doljack

[11] 4,228,513
[45] Oct. 14, 1980

[54] MONITOR SYSTEM AND METHOD FOR DETECTING SEQUENTIAL EVENTS IN A CYCLICAL PROCESS

[75] Inventor: Frank A. Doljack, Chagrin Falls, Ohio

[73] Assignee: The B. F. Goodrich Company, Akron, Ohio

[21] Appl. No.: 960,424

[22] Filed: Nov. 13, 1978

[51] Int. Cl.² .................... G08B 21/00; G06F 15/46
[52] U.S. Cl. .................................. 364/550; 198/856; 364/468; 364/478
[58] Field of Search ............... 364/550, 104, 468–477, 364/119, 111, 478; 340/676; 198/502, 856

[56] References Cited

U.S. PATENT DOCUMENTS

| | | | |
|---|---|---|---|
| 3,701,113 | 10/1972 | Chace et al. | 364/104 X |
| 3,792,459 | 2/1974 | Snyder | 198/856 X |
| 3,845,286 | 10/1974 | Aronstein et al. | 364/104 |
| 3,922,661 | 11/1975 | Enabnit et al. | 198/856 X |
| 3,983,373 | 9/1976 | Russell | 364/119 X |
| 3,987,429 | 10/1976 | Manduley et al. | 364/478 |
| 4,089,056 | 5/1978 | Barna et al. | 364/468 X |
| 4,092,719 | 5/1978 | Salmon | 364/468 |
| 4,094,055 | 6/1978 | Morimoto | 364/478 X |
| 4,106,005 | 8/1978 | Asakawa | 198/856 X |
| 4,121,818 | 10/1978 | Riley et al. | 364/478 X |

Primary Examiner—Edward J. Wise
Attorney, Agent, or Firm—James R. Lindsay

[57] ABSTRACT

The invention relates to a monitor system and method for monitoring the occurrence of events in a cyclical process. Whether the successive events occur at their proper positions within the process, position meaning, for example, a physical location and/or a position in time, is accurately monitored, and the process is stopped and a warning issued when an event is missed. Monitoring can be restarted at a point of interruption with resumption of correct checking for successive events. Moreover, if an event is missed, the process and monitoring may be restarted and the missed event selectively automatically deleted from the list of sequential events for which the monitor system looks. The invention is employed, for example, in connection with a conveyor belt system to detect rips in the belt.

118 Claims, 17 Drawing Figures

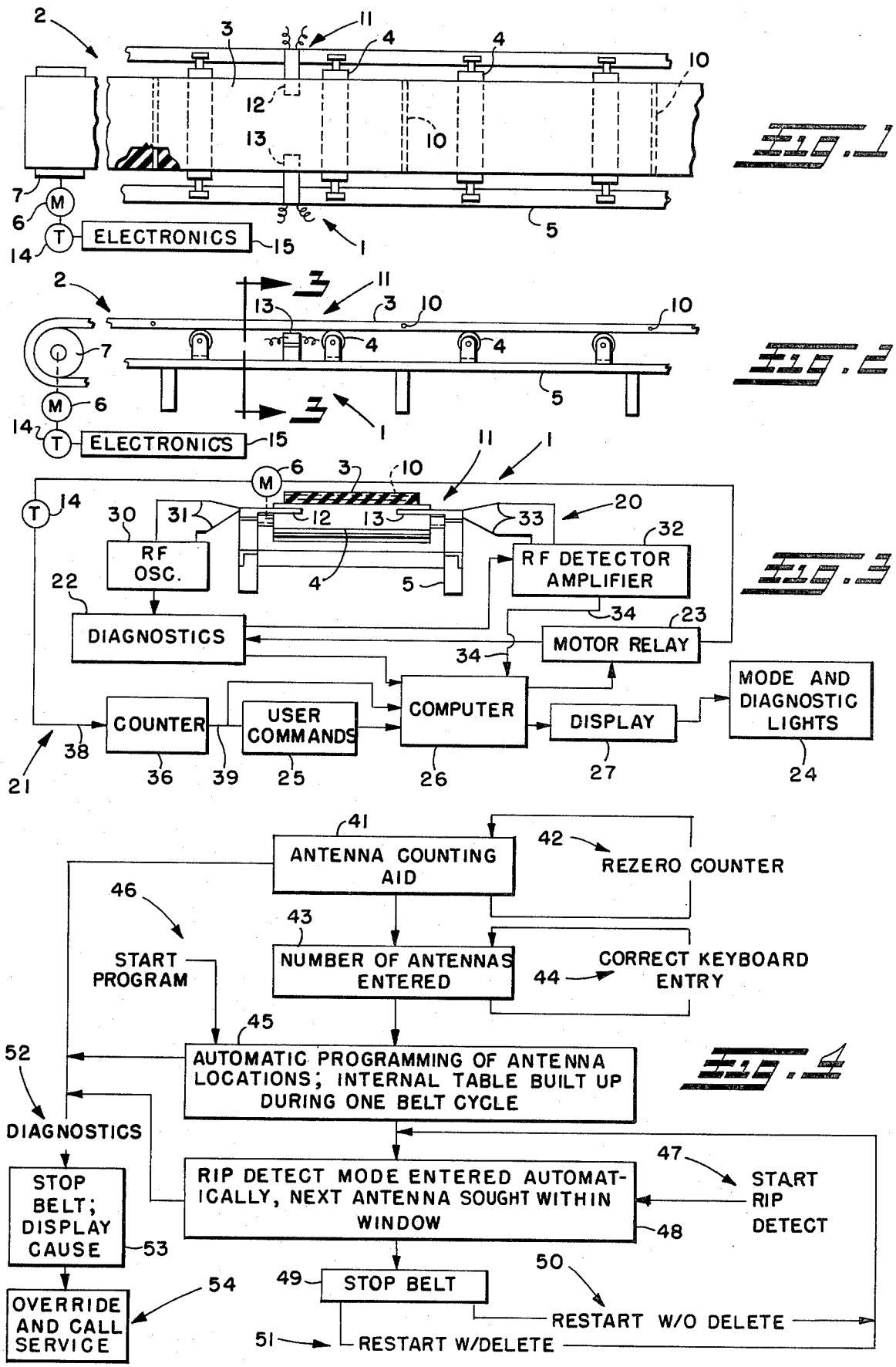

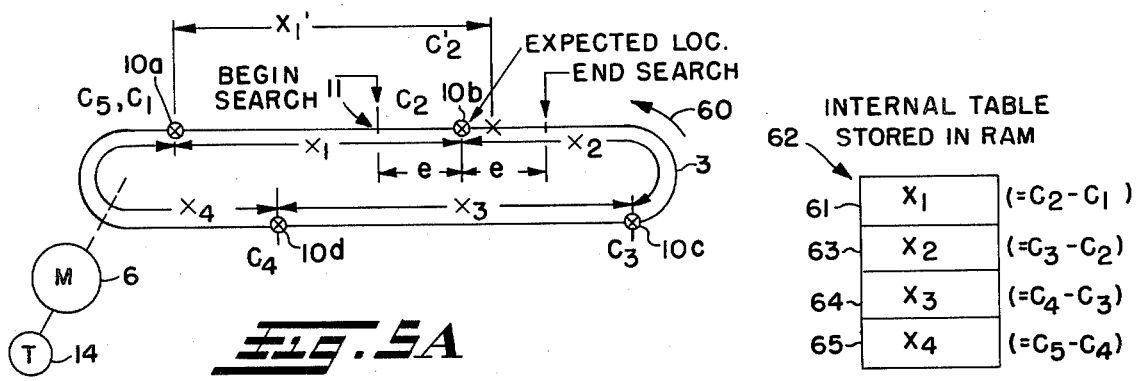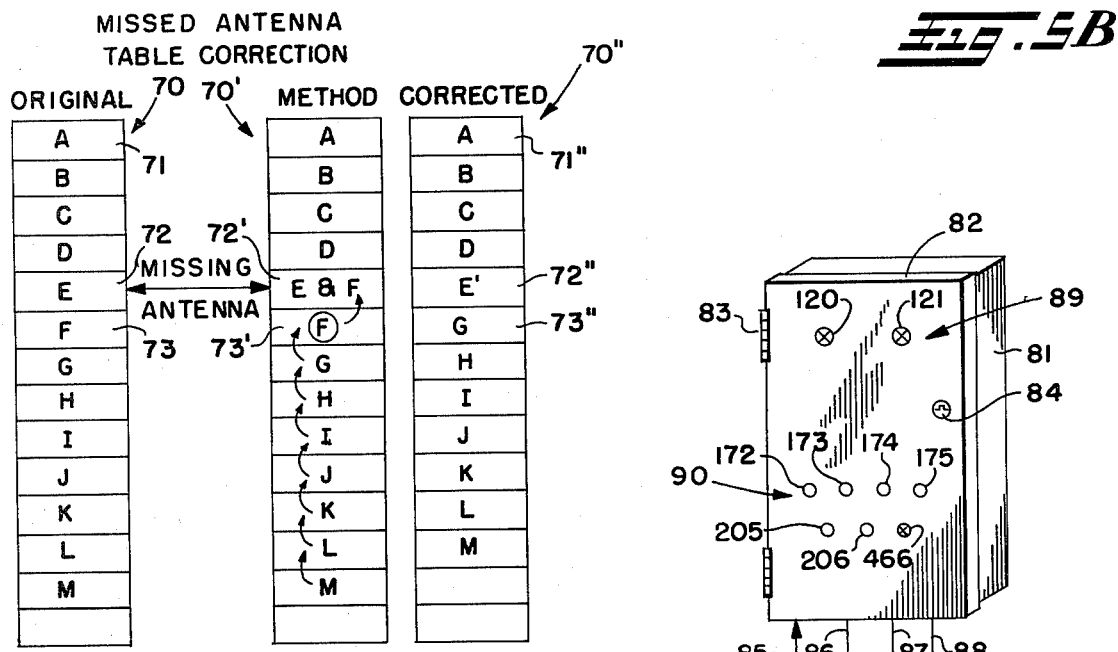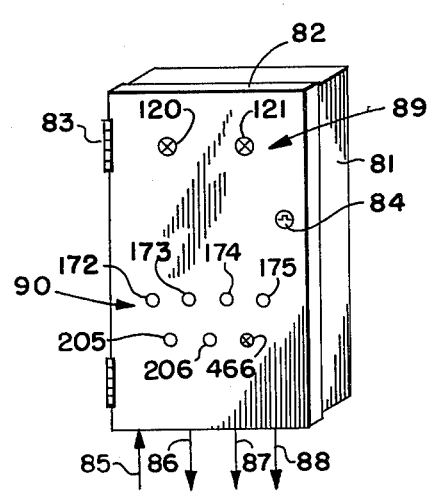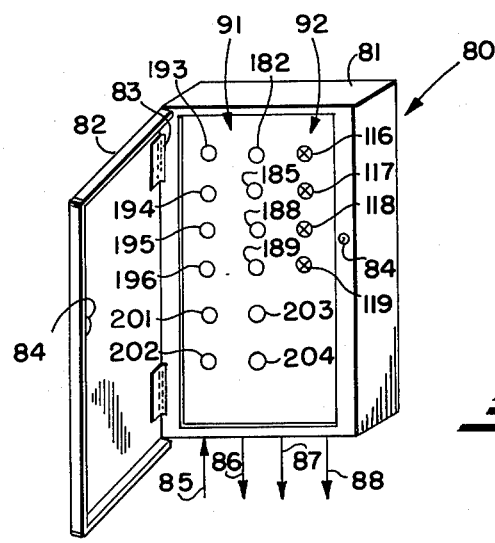

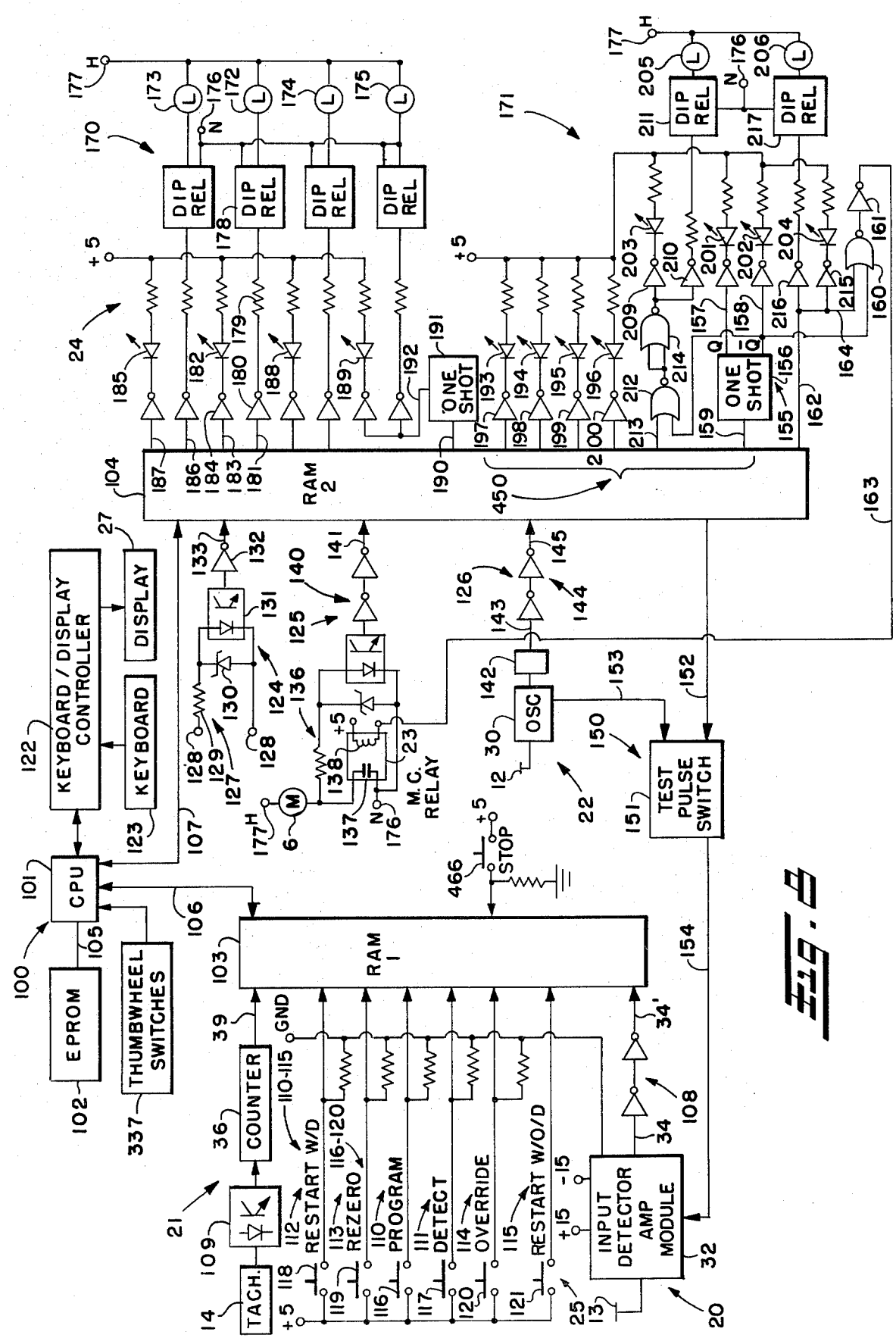

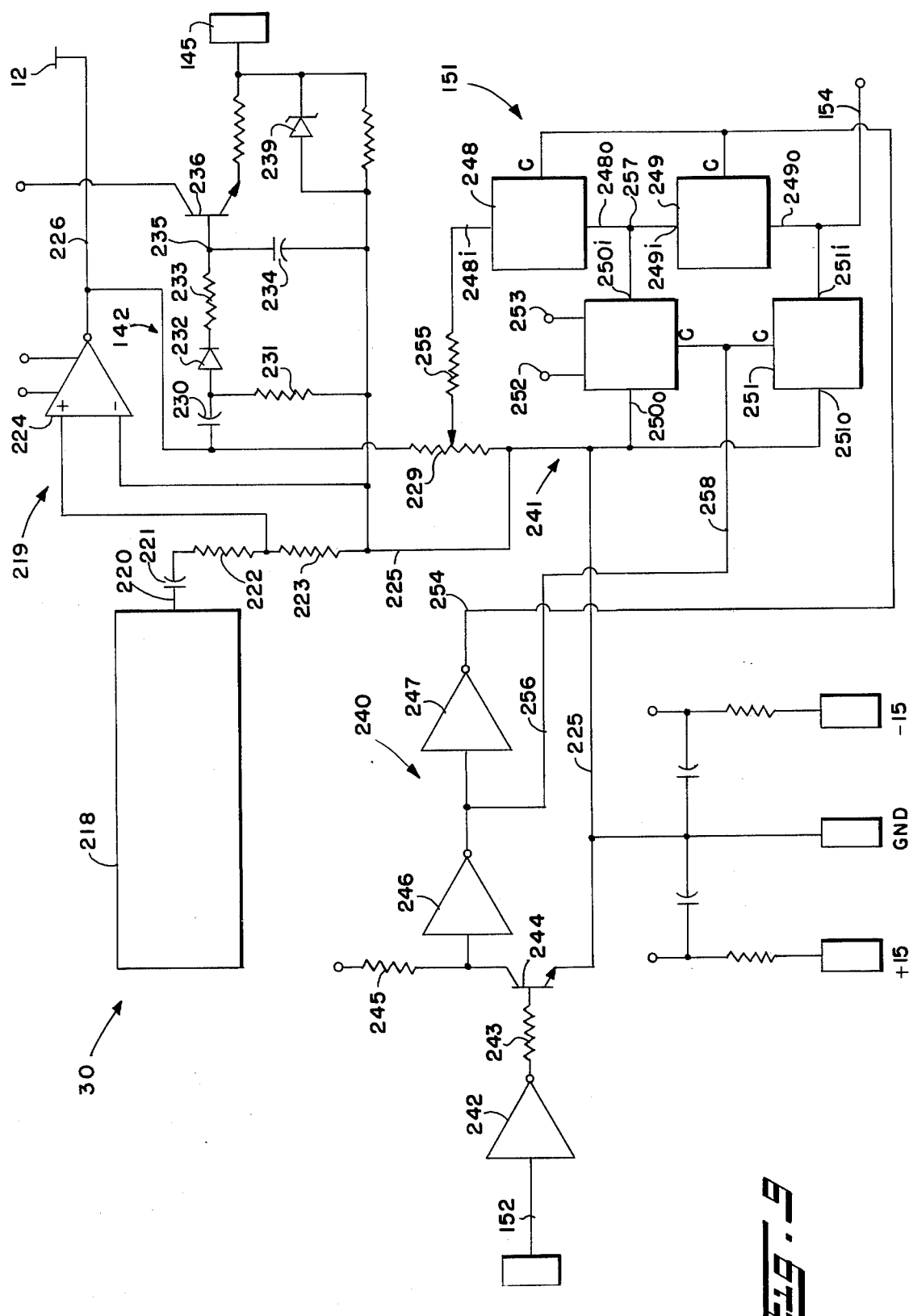

MONITOR SYSTEM AND METHOD FOR DETECTING SEQUENTIAL EVENTS IN A CYCLICAL PROCESS

BACKGROUND OF THE INVENTION

The present invention relates generally, as indicated, to a monitor system and method and, more particularly, to a monitor system and method for detecting whether successive events occur at their proper positions in a process, for example, to stop the process and/or to issue a warning when an event is missed. The invention also is particularly directed to a monitor system for a rip detector for conveyor belts and the like.

In large endless non-metallic conveyor belts used to convey bulk material, there is a possibility of encountering a rip in the belt, for example, by a sharp object dropped thereon at the loading station. It is desirable promptly to detect such rips and, preferably, to shut down the conveyor belt upon such detection, thereby minimizing damage to the belt. One such conveyor belt rip detector is disclosed in U.S. Pat. No. 3,792,459. In such rip detector plural antennas, which may be single electrical conductors, are embedded in the belt transversely to its length at spaced-apart locations in the belt. An electrical signal is coupled by respective antennas from a transmitter to a receiver as the belt moves and the respective antennas pass in capacitive coupling relation with the transmitter and receiver at a rip detector station. The electrical signal charge capacitively induced in each of the unbroken antennas is, thus, transmitted to the receiver and is sensed by detector circuitry thereof. However, a broken antenna, for example at a place where the belt has been ripped, will not couple the transmitter signal through to the receiver, and the detector circuit, then, senses the same as an indication of the occurrence of a rip condition. The detector circuit in such patent is operative after the lapse of a predetermined time period, which corresponds to the time required for the passage of a given number of broken antennas past the rip detector station without the coupling of the transmitter signal to the receiver, to produce a distinguishable output that activates an alarm and/or deactivates the conveyor belt drive.

The undesirable inaccuracy in such prior rip detector due to the long waiting period to see whether after an antenna has been missed the next antenna is detected means that a rather long and expensive to repair rip may occur before the conveyor is shut down. Moreover, since such conveyor belts are known to stretch, for example on the order of about 20%, during useful life, the indicated waiting period must be adequately long to accommodate the lengthened belt, thus further reducing the accuracy of detection and promptness of shut-down.

Accordingly, it would be desirable to provide a conveyor belt rip detector system that has improved accuracy enabling the same to detect a rip promptly upon occurrence thereof, even as conditions, such as the belt length, change.

Another disadvantage with such prior rip detector is the lack of diagnostic capability. When a shut-down of the conveyor belt occurs, for example, due to a failure in the rip detector, rather than a rip in the conveyor belt, the time wasted diagnosing the failure can be expensive in terms of lost production time of the conveyor belt. Alternatively, if the conveyor belt were operated without rip detector protection, for example while a rip detector failure is diagnosed, the unprotected belt may be completely ruined by a continuous rip that shoud have been detected by a properly operating rip detector.

Therefore, it would be desirable to facilitate diagnosing failures in the rip detector system itself to minimize down time and/or unprotected operation of a conveyor belt.

SUMMARY OF THE INVENTION

Briefly, the invention relate to a monitor system and method for monitoring the occurrence of events in a cyclical process. Whether the successive events occur at their proper positions within the process, position meaning, for example, a physical location and/or a position in time, is accurately monitored, and the process is stopped and a warning issued when an event is missed. Monitoring can be restarted at a point of interruption with resumption of correct checking for successive events. Moreover, if an event is missed, the process and monitoring may be restarted and the missed event selectively automatically deleted from the list of sequential events for which the monitor system looks. The monitor system is versatile in that it may be conveniently programmed to monitor different process having respective numbers and positions of events occurring in cyclical order. To effect such monitoring, the monitor system automatically builds a table of information concerning the expected position of each event. The monitor system looks for each event at its proper position, usually within a selected window of error on both sides of the anticipated position, and upon detecting an event the monitor system updates its internal information concerning the actual position of the event. Thus, the monitor system automatically adjusts for gradual variation in the position of each event within the permitted window of error.

Although the preferred embodiment and best mode of the monitor system of the invention is employed in connection with a conveyor belt system to detect rips in the belt, as will be described in greater detail below, it will be appreciated that the monitor system may be used to monitor the occurrence of any group of events that occur in a cyclical process. For example, the monitor system may monitor an automatic machining process. The position of a part within a multiple operation machine is compared against information developed by transducers indicative of the physical characteristics of the part; if the signals do not compare properly for a given stage in the machine process, the monitor system will shut down operation until an inspector determines the reason for mismatch, such as a broken cutter tool or the like. Similarly, the activities of a watchman may be supervised by the monitor system by sensing proper check-in of the watchman at each post during rounds. Should the watchman fail to check in at a given post by a certain time, an appropriate warning may be issued by the monitor system.

The fundamental components of the monitor system include an event detector for receiving information concerning the occurrence of each event in a cyclical process; a progress detector for receiving information indicative of the progress of or position in the process at any time; storage means for storing information concerning the expected positions of the events in the process; and a comparator, in the preferred embodiment a computer and most preferably a microcomputer, for comparing information from the event and progress detectors and the storage means to sense particularly whether respective events are occurring at the appropriate positions in the cyclical process. The monitor system also preferably includes a start stop control, which particularly shuts down the process when an event is missed by the comparator, and a diagnostics portion, which continuously checks the operation of monitor system and/or the equipment monitored thereby, such as the conveyor belt drive, and stops such equipment when a failure or fault is detected. Preferably mode and diagnostic indicators, such as selected lights, provide information to a user concerning the particular operational mode of the monitor system and/or the reason for any shut-down. Additionally, a user command portion may be selectively operated by a user of the monitor system to cause operation thereof in respective selected modes.

According to the method of the present invention, information concerning the relative positions of the events in the process is obtained. For example, the number of events in a cyclical process may be counted, and with the number of events known or while the process progresses through one complete cycle, the relative position of each event is sensed and stored. After such positions are known, the process is monitored to observe whether each event occurs at its anticipated position in the process, usually allowing for a selected window of error on both sides of such position. As each event is detected, the information concerning the expected relative position thereof is updated with information concerning the actual position of that event to accommodate, for example, gradual stretching of a conveyor belt while maintaining accuracy of rip detector function. After a shut down, for example, due a missed event, the process may be restarted, according to the method of the invention, either with or without deleting of that missed event including the information concerning the relative position of that event from subsequent monitoring.

With the foregoing in mind, a primary object of the invention is to provide a monitor system and a monitor method that are improved in the noted respects and, more particularly, such a monitor system and method used in connection with conveyor belt equipment for detecting rips in the belt.

Another primary object is to detect whether successive events of a cyclical process occur at proper position in the process and, additionally, to shut down the process and to issue a warning when an event is missed.

An additional object is to facilitate initializing a monitor system which monitors the occurrence of events in a cyclical process by permitting initialization at any point in the process without the need for an absolute starting position.

A further object is to provide improved diagnostic capability in a monitor system and to provide ready output information indicative of system operation and any detected failure thereof.

Still another object is to provide automatic tolerable error compensation in a monitor system for monitoring the occurrence of successive events in a cyclical process, particularly to accommodate inaccuracies in the position of each event in such process.

These are, of course, general objects, which, together with other objects and advantages of the present invention, will become more apparent as the following description proceeds.

To the accomplishment of the foregoing and related ends, the invention, then, comprises the features hereinafter fully described in the specification and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a partial top plan view of a conveyor belt system with which the monitor system of the invention may be used;

FIG. 2 is a side elevation view of the conveyor belt system of FIG. 1;

FIG. 3 is a schematic system diagram of the monitor system of the invention used as a conveyor belt rip detector;

FIG. 4 is a flow chart diagram illustrating the several operating modes of the monitor system;

FIG. 5A is a schematic representation of the antennas of a conveyor belt depicting their cyclical passage as respective events detected by the monitor system;

FIG. 5B is a chart illustrating the internal table stored in the monitor system as a representation of the distances between adjacent antennas;

FIG. 6 is a chart illustrating the method of tabular correction of such internal table when an event is deleted therefrom;

FIGS. 7A and 7B are schematic illustrations of a control box for the monitor system;

FIG. 8 is a schematic electric circuit diagram, partly in block form, of the monitor system in accordance with the present invention;

FIG. 9 is a schematic electric circuit diagram, partly in block form, of the oscillator module for the monitor system; and FIGS. 10A through 10F illustrate a representative flow chart of procedures and steps followed in operation of the monitor system in accordance with the method of the invention as represented by a continuous program flow chart.

DETAILED DESCRIPTION OF INVENTION

Figure 10A:
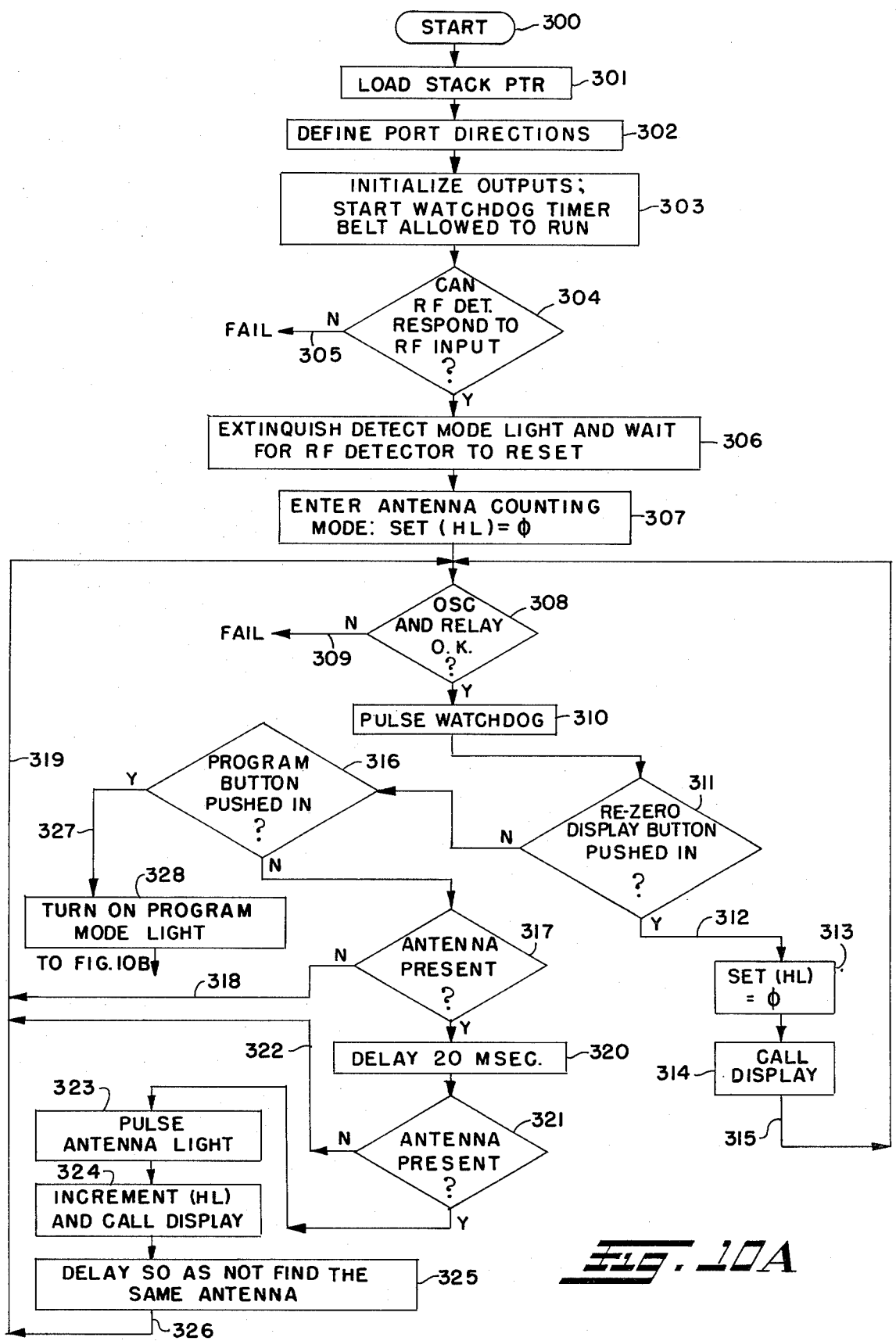
Figure 10B:
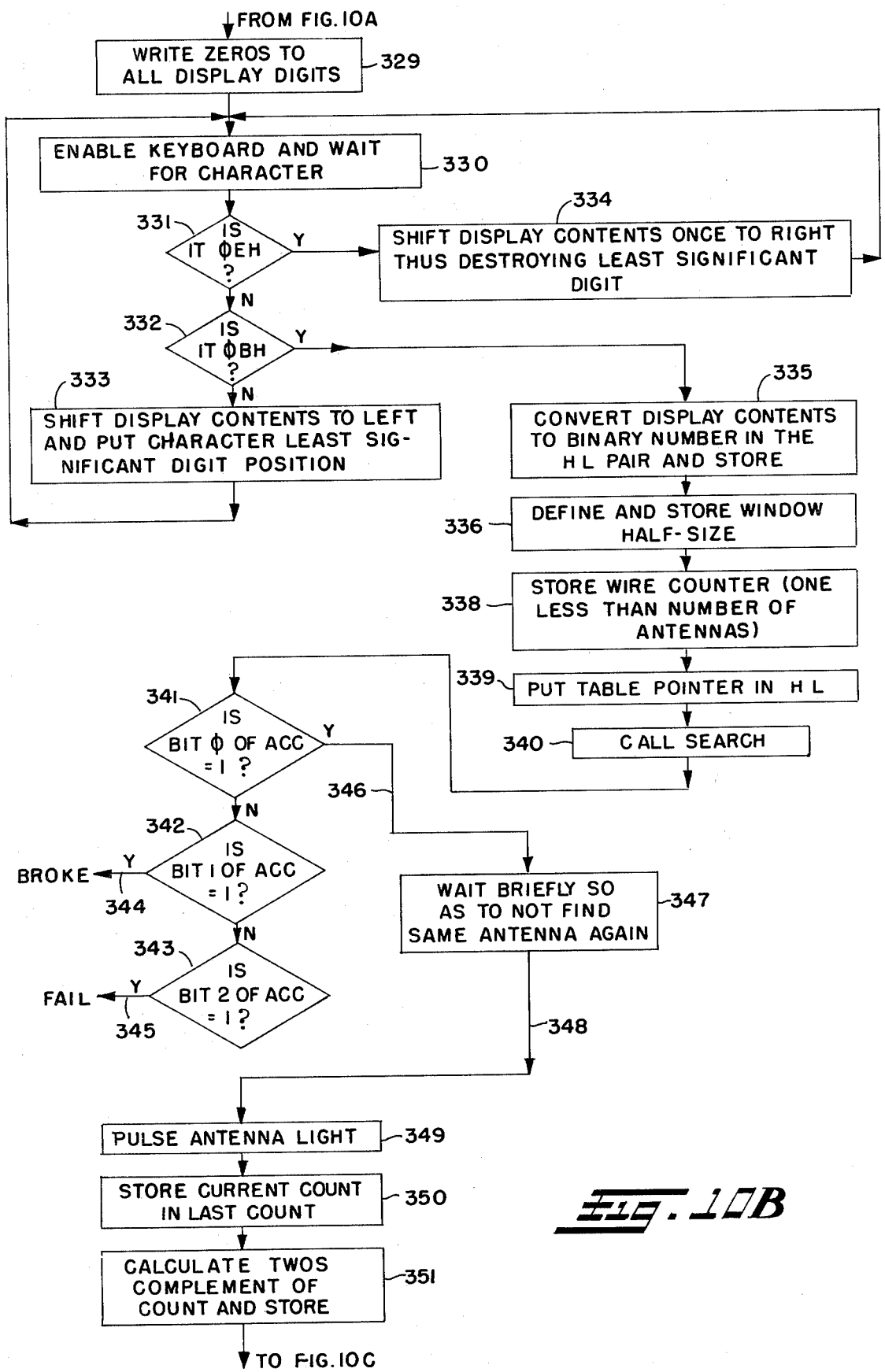

Referring now in detail to the drawings, and initially to FIGS. 1 and 2, a monitor system in accordance with the present invention is generally indicated at 1 is association with conveyor belt system 2. Therefore, in accordance with the best mode of the invention, the monitor system 1 is used to detect a rip, tear, or other similar flaw (hereinafter collectively rip) in the conveyor belt 3, such as a conventional endless, nonmetallic conveyor belt. The belt 3 is supported by rollers 4 at longitudinal stations along a support frame 5 and is driven by a motor 6 which turns a drive roller 7, for example.

The transducer technique for observing the structural integrity, or lack of the same, e.g. a rip, of the belt 3 uses a plurality of antennas 10 embedded in or otherwise secured to the belt generally transversely to the travel direction thereof and at a rip detector station 11 a transmitter plate 12 and a receiver or detector plate 13. Each antenna 10 preferably is a single electrical conductor of relatively small gauge, or other type of electrical conductor, intended, when passing the station 11, to capacitively couple with the transmitter and receiver plates 12, 13 to couple an electrical signal therebetween. Such signal coupling indicates the structural integrity of the antenna and proximate portions of the belt 3; the lack of such signal coupling where it is expected to occur generally indicates a flaw, such as a break in the antenna and a rip in the proximate portion of the belt 3. Accordingly, as the belt 3 progresses in its process of traveling along its total length, the monitor system 1 ontinuously looks for the sequential cyclical occurrence of events, namely the passing of the respective antennas by the rip detector station 11. The monitor system 1 also particularly observes the progress of such process, for example by monitoring the rotation or output of the motor 6 or rotation of the drive roller 7 with a conventional tachometer 14, and correlates such progress information with the detected event information to sense promptly when an event has been missed. Upon missing an event, the monitor system 1 promptly stops the motor 6 to shut down the conveyor belt system 2 minimizing any rip damage to the belt 3. Control of the monitor system 1 and signal manipulation and analysis is effected by an electronics portion 15.

It will be appreciated that although the monitor system 1 is described herein in its best mode for providing rip detector protection for a conveyor belt system 2, the monitor system 1 may be similarly employed for monitoring other cyclically occurring events in relation to the progress of a process in which those events occur. Moreover, although the capacitive coupling transducer technique and the progress information obtained from the output of motor 6 described herein are employed according to the best mode of the invention, it will be appreciated that other transducer and information gathering techniques may be used to obtain event signals and progress information associated with a conveyor belt system rip detector and/or with other cyclical processes.

Turning now more particularly to FIG. 3, there are illustrated the fundamental components of the monitor system 1, including an event detector 20, a progress detector 21, a diagnostics portion 22, a shut-down control portion 23, an output indicator portion 24, a user command portion 25, a comparator portion 26, such as a computer, and preferably a microcomputer, that stores and compares information received from the various portions of the monitor system and effects appropriate control in response to such information, and a display portion 27.

The event detector 20 is coupled to an event transducer including the transmitter and receiver plates 12, 13 at the rip detector station 11 in proximity to the belt 3 for capacitive coupling to and through an antenna 10. The detector 20 includes an oscillator 30, which produces an AC electrical signal, preferably in the radio frequency range, for example, on the order of about 200 KHz, delivered by an electrical connection 31 to the transmitter plate 12; and a detector amplifier 32 coupled to the receiver plate 13. When an antenna 10 passes in proximity to the transmitter plate 12 such AC signal is capacitively coupled to the antenna. Moreover, assuming such antenna is whole, i.e. in particular there is no rip in the belt 3 at that location, such signal will be capacitively coupled from the antenna to the receiver plate 13 for delivery via an electrical connection 33 as an event signal to the detector-amplifier 32. The detector-amplifier 32 preferably is primarily responsive only to an event signal that has a frequency at least approximately equal to the AC signal produced by the oscillator 30; accordingly, the detector-amplifier 32 preferably is a radio frequency responsive device. Receipt of a proper event signal is communicated as an event detect signal by a connection 34 to the computer in the comparator portion 26.

As described herein, the process observed by the monitor system is the movement of the conveyor belt 3. Progress of such movement is detected by the progress detector 21, which may include a progress transducer in the form of a tachometer 14 and a counter 36. The tachometer 14 is connected to the conveyor belt drive motor 6 or drive roller 7 and produces in conventional manner a series or train of electrical pulses on line 38. The frequency of such pulse train preferably is directly proportional to the rotational speed of the motor 6 and, accordingly, directly proportionally represents the progress of the belt 3 as it is driven along its path. The counter 36 converts the serial pulse train information from the tachometer 14 to parallel binary data, such as a 16 bit binary number, the progress signal, which also directly represents progress of the belt 3 and is delivered on a bus 39 to the computer in comparator portion 26.

Briefly, in operation of the monitor system 1 observing the belt 3 to sense whether a rip has occurred, information concerning the relative interval distances between each pair of adjacent antennas is obtained and stored during one cycle of the belt 3. Using such information, the monitor system sequentially looks for each antenna at its expected position, within a tolerable window of error or offset. The relevant interval distance information is updated each time an antenna is detected. However, when an antenna is missed, i.e. it is not sensed at its expected position, the monitor system 1 stops the belt 3.

More particularly, the computer 26, when it receives an event detect signal on line 34, reads and stores the progress signal on bus 39. When the next event detect signal is received, the computer 26 again reads and stores the progress signal on the bus 39. The value of the difference between the two progress signals, then, represents the distance between the two adjacent antennas 10 that passed the rip detector station 11 to produce the two event detect signals. This procedure is repeated to obtain information concerning the distances between each pair of adjacent antennas. Such information is measured or detected and is stored, for example in a table, during a programming mode of operation of the monitor system 1. After the table has been completed with information concerning the distances between every pair of adjacent antennas, the monitor system 1 can operate in a rip detect mode. More particularly, in the rip detect mode the computer 26 compares the progress signal on bus 39 with the relevant value of information from the stored table to determine when an antenna 10 should be present at the rip detector station 11. If there is a whole antenna properly positioned at the rip detector station 11 in capacitive coupling relation with the transmitter and receiver plates 12, 13 at that time, meaning that the conveyor belt 3 also is whole, then the monitor system begins looking for the next antenna. However, if, when expected, there is no antenna present at the rip detector station 11 or the antenna then present is broken, indicating a conveyor belt system 2 fault or a belt rip, respectively, no event detect signal will be delivered to the computer 26; accordingly, the computer 26 promptly declares the event missing and operates the start stop control portion 23 to stop the belt 3 in order to minimize any damage thereto.

Preferably the start stop control portion 23 is a relay that controls energization and de-energization of the motor 6 and/or a conventional clutch and braking system for the conveyor belt system 2. Operation of the relay 23 by the computer 26, then, determines whether or not the conveyor belt 3 will move. In the output indicator portion 24 plural mode lights and diagnostic lights, which are operated by the computer 26, indicate the operational mode of the monitor system 1 and the reason for any detected failure or shut-down of the conveyor belt system 2. The user command portion 25 may include a plurality of manually operated pushbutton controls or connections to receive electrical input control information from external equipment, such as a remote control panel, electronic control equipment, etc., to effect operational control of the monitor system, as will be described in detail further below.

Although detailed operation of the monitor system 1 will be described below with reference to the flow charts illustrated in FIGS. 10A–10F, the several operating modes for the monitor system 1 are depicted in a functional block diagram in FIG. 4. The monitor system 1 may be used as a counting aid for antennas or other events detected by the monitor system, block 41. This function is particularly useful when the antennas are embedded in a conveyor belt and are not ordinarily visually discernible. In such counting aid mode of operation, a user puts a reference mark on the belt 3, enters by user command portion 25 a rezero command for an internal counter in the computer 26 to cause the display 27 to show a zero count value, as represented at 42, and enters an input command to the monitor system 1 to start the conveyor belt system 2, e.g. by closing relay 23. As each whole antenna passes and is counted at the rip detector station 11, the event detect signal on line 34 causes the computer 26 to increment the value shown on the display 27. When the reference mark returns to the rip detector station, the value shown on the display 27 will indicate the number of whole antennas in the belt 3 detectible by the event detector 20. With the number of antennas or other events known, the user may enter that information to the computer 26, box 43, for example by a conventional keyboard, as represented at 44, of the user command portion 25. The user would then enter a command to the computer 26 via the keyboard or other switch, for example, to cause the monitor system to commence operation in the programming mode to build the table of information of the distances between adjacent pairs of antennas. The use of the monitor system 1 as an event counting aid and the just described keyboard entry of events to the monitor system are, however, alternate embodiments to the best mode of the present invention.

In box 45 the automatic programming mode of the antenna locations and the building of the internal table during one belt cycle is presented. According to the best mode of the invention, a user may put a reference mark on the conveyor belt 3 at the rip detect station 11 and enter a start programming command, represented at 46, to start the conveyor belt system to build up the table of relative distance information. When the reference mark returns to the rip detect station 11, the user may enter a start rip detect command signal, represented at 47, for example by a further switch that delivers an appropriate signal to the computer 26, to cause the monitor system 1 automatically to observe the condition of the belt 3 to sense a rip therein. Such rip detect mode of operation is represented at box 48.

As an alternate embodiment to the best mode of the present invention, the computer 26 may be programmed to cause the monitor system 1 automatically to enter the rip detect mode. In this alternate embodiment, the number of antennas would have to be entered, box 43, as aforesaid. The monitor system, then, would automatically build the table of information for that number of antennas; upon completion of the table, the monitor system 1 automatically would enter the rip detect mode, box 48.

During operation of the monitor system 1 in the rip detect mode, according to the information contained in the table, the monitor system 1 will look for each successive antenna at its anticipated position relative to the progress of the belt 3. In order to take into consideration the possibility of slippage, stretching, and the like of the conveyor belt during its operation and life expectancy, as well as other similar inaccuracies in the actual position of respective antennas, a window of error is permitted preferably on both sides of the anticipated position of each antenna. Therefore, the monitor system 1 will look for an antenna slightly before its expected arrival at the rip detector station 11 and for a brief period after the expected arrival; if no antenna is detected within the permitted window, the monitor system 1 promptly stops the conveyor belt system 2, as shown at box 49. However, when the monitor system 1 does detect an antenna within an expected window, the actual position of that antenna, as detected by the progress detector 21, relative to the position of the preceding antenna, is input at the appropriate location in the table to update the same, thereby allowing the tabular information to vary gradually within prescribed limits.

Whenever the monitor system 1 shuts down the conveyor belt system 2 due to a missed antenna, the user may restart the conveyor belt system, usually after having visually inspected the belt. As is shown at 50, such restart may be without deleting the information concerning the missed antenna from the table to check, for example, whether the shut-down was due only to an inadvertently broken antenna. If the missed antenna were broken, even though the belt is otherwise intact, the monitor system 1 would shut down the conveyor belt system 2 at the completion of the next cycle. Usually the control for this type of restart operation would be accessible to a user in the field. However, if the monitor system 1 and conveyor belt system 2 were to be restarted with deletion from the table of the information concerning the broken antenna, say, as indicated at 51, then the system would continue operating in rip detect mode without looking for the suspect antenna during the subsequent cycles of operation of the conveyor belt. This latter type of restart operation ordinarily would be accessible only to a qualified serviceman, who would be expected to check the belt 3 and system 1 thoroughly before deleting the information concerning the suspect antenna from the table.

As is shown at 52 in FIG. 4, the diagnostics portion of the monitor system 1 continuously checks various portions of the system to assure proper operation thereof. In the event of a failure being detected by the diagnostics portion, the monitor system 1 will promptly stop the belt and will energize the mode and diagnostic lights indicators portion 24 appropriately to display the reason for shut-down, box 53. Moreover, the monitor system may be overridden manually by the user, box 54, to continue operation of the conveyor belt system 2 without rip detection by the monitor system 1. Ordinarily, such overriding would occur when it is believed that a failure has occurred in the monitor system 1 while the conveyor belt 3 remains intact.

Referring to FIGS. 5A and 5B, operation of the monitor system 1 in a programming cycle to build the interval distance table will be described. The exemplary conveyor belt 3 in FIG. 5A contains four antennas 10a through 10d, which pass the rip detector station 11 sequentially alphabetically as the belt is driven in the direction of arrow 60. To measure the four distance intervals between adjacent pairs of antennas, five event signals must be sensed at the station 11, i.e. the first sensed antenna must pass the station twice so that the distance between that first and the second antennas can be measured and the distance between the last and that first antennas can be measured.

Accordingly, when the first antenna 10a passes the station 11, this event already having occurred in FIG. 5A, the value of $C_1$ of the count on the counter 36 is read and stored by the computer 26. Subsequently when the next antenna 10b passes the station 11, causing a subsequent event detect signal, the computer 26 again reads the value of the count, this time $C_2$, on the counter 36. The computer 26 takes the difference between the values $C_2$ and $C_1$, as is illustrated in FIG. 5B, and places that difference value $X_1$ in a first memory location 61 in the table 62. The distance interval value $X_1$, then, is directly proportional to the actual physical distance between the two antennas 10a, 10b. The other antennas in the belt 3 are similarly detected during one complete cycle of the belt and similar calculations are made and information is stored to complete the table 62 with the distance interval values $X_2$ through $X_4$ being stored in memory locations 63 through 65. Upon completing the table 62, the monitor system 1 is promptly operable as aforesaid in a rip detect mode to look for each antenna at its expected position in the belt 3. In view of the foregoing, it will be clear that the monitor system 1 may commence its programming mode without regard to which antenna is the first detected; in other words, no reference location or antenna is required as long as programming occurs through one complete cycle of the process-belt travel.

Operating in the rip detect mode, the monitor system 1 promptly upon sensing the antenna 10a at the station 11 reads the count value on the counter 36. Then, the computer 26 adds the value $X_1$ from the first location 61 in the table 62 to that counter count value to determine the expected count value that should be on the counter when the next antenna 10b is sensed at the station 11. It is possible that the next antenna may not be exactly at its expected position due, for example, to belt slippage, stretching, and the like. Therefore, the user of the monitor system 1 may enter into the same an offset value or amount that defines a window of error on opposite sides of the exact expected position of the next antenna. For example, the offset value "e" may be subtracted and added, respectively, relative to the count value anticipated to be on the counter 36 when the next antenna is expected to pass the station 11, as is illustrated in FIG. 5A on opposite sides of the antenna 10b. In the rip detect mode, the monitor system will look for the arrival of the antenna 10b at the station 11 when the value on the counter 36 equals the count value $C_2$ minus the offset value e and will continue looking for that antenna until it is found or until the value on the counter 36 exceeds the value $C_2$ plus the offset value e. If the expected antenna is not found within the tolerable window of error, the monitor system 1 promptly declares the event as missing and operates the relay 23 to stop the conveyor belt system 2.

Moreover, to accommodate continuous errors, for example as the belt 3 continues slipping or stretching during its use, the table 62 is continuously updated with count value information from the counter 36 as an indication of the actual position of each antenna as it passes the rip detector station 11 during each cycle of the conveyor belt 3. When an antenna, such as the antenna 10b, is actually found within a window of error, but not exactly at its expected count value position $C_2$, the actual count value on the counter 36 is subtracted from the count value at which the prior antenna was found to obtain a value $X_1'$. This relative distance value $X_1'$, then, is substituted in the table 62 at location 61 to replace the prior value $X_1$. In this manner the relative interval distance information is continuously updated to maintain accuracy of the monitor system 1 in performing its event detecting, namely, rip detecting, function.

Since the values stored in the table 62 only represent relative interval distance information without regard to the actual or absolute count value on the counter 36 at any given time, the counter 36 actually may count through more than one complete counting cycle of, for example, $2^{16}$ counts, according to the preferred embodiment, during any one complete cycle of the monitored process. Thus, the monitor system is versatile in that it is capable of monitoring cycles that are longer than an interval counting cycle of the monitor system counter. Moreover, since the monitor system 1 always looks for the next antenna on the basis of updated information concerning a previously detected antenna combined with information concerning the expected distance to the next antenna accuracy of detection and promptitude of shut down are maintained.

In some circumstances it may be desired to delete an event from a process, i.e. to preclude the monitor system 1 from searching for a particular event. For example, if an antenna has broken and is undetectable at the station 11, although the belt 3 is not ripped, information concerning that broken antenna should be deleted from the table stored in the monitor system 1 so that the belt will not stop each time that broken antenna passes the station 11.

The method for deleting from the table information concerning a broken antenna, or other missed event, is illustrated in FIG. 6. In the table 70 information concerning the interval distances A–M for thirteen pairs of adjacent antennas is shown. In memory location 71 the value A represents the interval distance between a first and second antenna. In memory locations 72 and 73 the values E and F, respectively, represent the interval distances between fifth and sixth antennas and sixth and seventh antennas. In the course of operation of the monitor system 1, if the sixth antenna breaks and causes the monitor system 1 to stop the conveyor belt system 2, a user, usually after visually inspecting the belt 3 to assure it is not ripped, may effectively delete the sixth antenna from the table. Such deletion is effected according to the table 70', as follows:

The monitor system 1 is prevented from looking for the broken sixth antenna while assuring that the system will look, after detecting the fifth antenna, for the original seventh antenna. The seventh antenna is a distance proportional to the sum of values E and F from memory locations 72, 73. These values E and F are added by the computer 26 and the sum is stored in memory location 72' of the table 70', which is the same as memory location 72 in table 70, but with the thusly revised information. Moreover, all of the values G through M stored in the table below memory location 73' are moved up one memory location in the table to avoid leaving any "holes" in the table. Thus, the value G is moved up to memory location 73', and so on. The corrected table, then, is shown at 70", including for example, at memory locations 71", 72", 73", respectively, values A, E' (equal to the sum of original values E and F), G. It will be appreciated that although there is an empty memory location at the end of the table after the location at which value M is stored, by using a conventional end of file notation, the computer 26 can accurately keep track of the number of values in the table and, thus, antennas or other events to be monitored in the process.

Referring briefly to FIGS. 7A and 7B, there is schematically shown a control box 80 for housing the monitor system 1 and particularly the electronic portions thereof. The control box 80 may be a conventional weatherproof metal box conveniently mountable in proximity to the conveyor belt system 2 for facile connection to and control of the latter and may include a main container portion 81 and a cover 82 connected to the former by a hinge 83. A key operated lock 84 normally prevents opening of the cover 82; however, a qualified inspector or repair person ordinarily would have a key to unlock the lock 84 and open the cover 82 on the hinge 83 to gain access to the electronics portion of the monitor system 1.

An electrical connection 85 brings electrical power to the monitor system 1, and connections 86–88 provide electrical coupling, respectively, to the transmitter plate 12, receiver plate 13, and tachometer 14 for electrically energizing and/or receiving information from the same. A pair of user operated push button switches 89 mounted on the cover 82 are accessible externally of the control box 80 with the cover 82 locked closed and may be selectively pushed by a user to effect operation of the monitor system 1 and conveyor belt system 2. Additionally, a plurality of operational mode indicating and failure mode indicating lights 90 also are mounted on the cover 82 for external viewing by a user. Within the control box 80 are a further group of visual indicators 91 and push button switches 92. The switches and indicators of the monitor system will be described further below with reference to FIG. 8.

A schematic electric circuit diagram of the monitor system 1 is illustrated in FIG. 8. The comparator portion 26 is a microcomputer 100 that receives input signals from various portions of the system 1 and in response to respective inputs produces control signals to control overall operation of the system 1. The microcomputer 100 includes a central processing unit 101, such as a model 8080 or 8085 microprocessor manufactured by Intel Corporation, a non-volatile memory 102, such as an EPROM, and a pair of volatile random access memories (RAM) 103, 104. The EPROM 102 may be one or more erasable and electrically reprogrammable read only memory integrated circuits manufactured by Intel Corporation under Model No. 8755, each containing 2K×8 memory capacity, and the RAM's 103, 104 may be integrated circuits manufactured by Intel Corporation under Model No. 8155, each containing 256×8 memory capacity.

The CPU 101 is coupled to the EPROM 102 conventionally by a connection 105 representing one or more buses and/or discrete lines for transmission of signals for timing, chip select, address and program data, and like purposes therebetween. The manner in which the program information stored in the EPROM 102 causes operation of the CPU 101 and, thus, the entire monitor 1, will be described in detail below. The CPU 101 also is coupled conventionally to the RAM's 103, 104 by connections 106, 107, respectively, which also represent one or more buses and/or discrete line connections for transmission between the CPU and respective RAM's of timing, chip select, address and data information, and like signals.

Input ports of RAM 103 receive input information from the user commands portion 25, the detector amplifier 32 of the event detector 20, and the progress detector 21. Each time the receiver plate 13 receives an AC signal from an antenna passing the rip detector station 11, the detector amplifier 32 produces the event detect signal on line 34 as an input to input port 34' of the RAM 103. A plural stage inverting amplifier circuit 108 isolates the event detect signal and amplifies the same prior to its delivery from the detector amplifier 32 to an input port of the RAM 103. The bus 39, which may include, for example, sixteen lines, connects the counter 36 of the progress detector 21 to respective input ports of the RAM 103. A conventional opto-isolator circuit 109 provides electrical isolation between the tachometer 14 and the counter 36. The value of the count on the bus 39 at any given time will be indicative of the approximate relative position of the conveyor belt 3 and, particularly, the portion of the latter which is in alignment with the rip detector station 11.

The user commands portion 25 includes six user command signal generating circuits 110–115 for commanding selected modes of operation of the monitor system 1. Each such circuit, when not selected, delivers a logic 0 signal to a respective input port of the RAM 103. However, each user command circuit includes a manually operable switch 116–121 delivering to a respective input port of the RAM 103 a logic 1 signal when pushed by a user to command selected operation of the monitor system 1.

Brief closure of switch 116 energizes the program mode circuit 110 to cause the monitor system 1 to close the motor control relay 23 to start the conveyor belt system 2 for operation of the monitor system 1 in its program mode to build the table of relative interval distance information. After the belt 3 has run through one complete cycle, the user would briefly depress or close switch 116 a second time to signal completion of such belt cycle and to initiate operation of the monitor system 1 in a rip detect mode. Alternatively, the user would briefly close the switch 117, if used, to select the detect mode circuit 111 commanding operation of the monitor system 1 in its rip detect mode. When the monitor system 1 has declared an antenna missing and stopped the conveyor belt system 2, a restart with deletion of the missed antenna can be effected by the user closing the switch 118 in the restart with delete circuit 112. In the alternate embodiment using the display 27, closure of the switch 119 in a re-zero circuit 113 commands a rezeroing of the display; thereafter, the monitor system 1 in its antenna counting mode may count the total number of antennas in the belt 3 and display that number on the display 27. Preferably the switches 116–119 are contained within the usually locked portion of the control box 80. However, access to the override and restart without delete switches 120, 121, which are mounted on the cover 82, ordinarily would be available to any user. Closure of the override switch 120 enables operation of the conveyor belt system 2 without rip detector protection of the monitor system 1 when there is a fault in the monitor system and it is desired to continue operation of the conveyor belt system 2. However, after the monitor system 1 has declared an antenna missing and stopped the conveyor belt system 2, the latter may be restarted without deletion of the apparently missing antenna by closure of the restart without delete switch 121; if such antenna is broken, the monitor system 1 will stop the belt 3 at the end of the next complete belt cycle.

The display 27 is controlled by the CPU 101 via a conventional keyboard/display controller circuit 122. The display 27 may be a conventional several digit light-emitting diode display, the elements of which are energized by respective latch and/or buffer circuits controlled by the controller circuit 122, such as a Model No. 8279 integrated circuit manufactured by Intel Corporation together with appropriate scanning, amplifying, and/or drive circuitry. A conventional keyboard 123, such as a 16 digit hexagonal code keyboard, is connected to the controller 122, for example, to input information representing the number of antennas in the belt 3 and/or to effect other selected type of control of the monitor system 1 to facilitate diagnosing faults. Ordinarily, the keyboard 123 would be locked in the control box 80. In operation of the monitor system 1 utilizing the controller circuit 122, keyboard 123, and display 27, a user would press the rezero switch 119 causing the display 27 to be zeroed. The belt 3, then, would start promptly, and the number presented on the display 27 will be incremented each time the detector amplifier 32 detects an antenna passing a rip detector station 11 and produces an event detect signal on line 34. When the belt has completed one cycle, the number presented on the display 27 will indicate the number of antennas in the belt. Prior to operation of the monitor system 1 in a program mode, that number of antennas is entered through the keyboard 123, and the program switch 116 is closed. The system 1 then operates in the program mode until the interval distance table is completed for the total number of antennas in the belt. Thereafter, the system 1 automatically would switch to operation in a detect mode, as aforesaid.

Fault detection monitoring of the various portions of the monitor system 1 and of the conveyor belt system 2 and controlling of the mode and diagnostic lights of the output indicators portion 24 is effected primarily via the input ports of RAM 104. The diagnostics portion 22 includes a belt-run monitor circuit 124, a motor control relay monitor circuit 125, and an oscillator monitor circuit 126. The belt-run monitor circuit 124 includes an input circuit 127 which receives an externally derived input signal across terminals 128 when the conveyor belt 3 is properly running, for example, by a transducer coupled to the drive roller 7. The input circuit 127 includes a current limiting resistor 129, a Zener diode 130, which develops a voltage thereacross when the belt is running, and a conventional opto-isolator circuit 131. An inverting amplifier 132 provides isolation and signal amplification of the signal from the belt-run monitor circuit 124 and delivers on line 133 a belt check signal having a logic 1 or logic 0 level indicative, respectively, of whether or not the belt 3 is properly running.

The motor control relay monitoring circuit 125 includes an input circuit 136, like the input circuit 127, connected across contacts 137 of the relay 23, which open and close in response to coil 138 to control motor energization. The circuit 136 produces, after signal inversion and amplification by inverting amplifier stages 140, a logic 1 or logic 0 relay check signal on line 141 indicative of whether or not the contacts 137 are closed.

The oscillator monitoring circuit 126 includes a filtered half wave rectifier 142, which in response to receiving an AC signal from the oscillator 30 produces a logic 1 signal on line 143. Inverting amplifier stages 144 provide signal amplification and isolation and deliver on line 145 a logic 1 or logic 0 oscillator check signal indicative of whether or not the oscillator 30 is producing a proper AC signal for energizing the transmitter plate 12.

Preferably the belt check signal is at a logic 1 level when the belt 3 is operating properly; the relay check signal is a logic 1 when the contacts 137 are closed; and the oscillator check signal is a logic 1 when the oscillator 30 is producing a proper AC signal.

The diagnostics portion 22 also includes a detector amplifier test circuit 150 to confirm proper operation of the detector amplifier 32, for example, whenever an antenna is not detected at its expected position. The test circuit 150 includes a test pulse switch 151, such as an analog switch, that closes in response to a test signal on line 152 from an output port of RAM 104 under command of the CPU 101 whenever an antenna is missed but before the monitor system 1 declares the antenna missing. Closure of the switch 151 passes a test pulse signal on line 153 from the oscillator 30 to line 154 and the detector amplifier 32. If the detector amplifier 32 is operative, in response to the test pulse signal it will produce an event detect signal at line 34 to confirm such proper operation; the monitor system 1 then declares the missed antenna missing. Conversely, if no event detect signal is produced then, the monitor system 1 shuts down the conveyor belt system 2 and operates the output indicators portion 24 to indicate a failure in the detector amplifier 32.

Also in the diagnostics portion 22 is a CPU monitor circuit 155 that senses whether the CPU 101 is operating properly. The CPU monitor circuit 155 includes a conventional one-shot multivibrator 156 having Q and $\overline{Q}$ outputs 157, 158. An output port 159 of the RAM 104 is connected to the input of the one-shot multivibrator 156. The program information stored in the EPROM 102 periodically causes the CPU 101 to produce at the output port 159 a watchdog signal that triggers the one-shot multivibrator 156 to maintain a logic 1 level at its Q output 157 and a logic 0 signal at its $\overline{Q}$ output 158. However, if there is a failure in the CPU 101 or in its control of and response to the program information in the EPROM 102, and too long a delay is provided between sequential watchdog signals, the one-shot multivibrator will time out causing a logic 1 signal at the $\overline{Q}$ signal 158. Such logic 1 signal at the $\overline{Q}$ output 158 acts through a NOR gate 160 and an inverting amplifier 161 to de-energize the coil 138 of the motor control relay 23 via line 163; therefore, the contacts 137 open and the motor 6 is de-energized to stop the conveyor belt 3.

A main motor control output port 162 from the RAM 104 also is connected by line 164 to the NOR gate 160. Whenever the monitor system 1 finds it necessary to stop the conveyor belt system 2, the CPU 101 causes the RAM 104 to produce a logic 1 stop signal at the output port 162 to deenergize the motor control relay 123, as aforesaid.

The output indicators portion 24 includes a mode indicating portion 170 and a failure indicating portion 171. In both portions inverting amplifiers are used, as illustrated, to drive respective visual indicators, such as light-emitting diodes (LED) and lamps, the latter being energized through respective relays, in response to signals developed at respective output ports of the RAM 104. The inverting amplifiers provide the usual signal isolating and amplifying functions.

In the mode indicating portion 170 there are four mode indicating lamps 172-175 visible at the front of the control box 80 to indicate the present operational mode of the monitor system 1. The lamp 172, which is typical, is a 110-volt, several watt lamp energized by power provided across a pair of AC input terminals 176, 177 under control of a conventional dual-in-line package relay 178. The relay 178 is coupled to a resistor 179 and an inverting amplifier 180. When a logic 1 signal appears at the output port 181 of RAM 104, the relay 178 is energized to provide power to operate the lamp 172, which indicates operation of the monitor system 1 in a program mode. Moreover, to facilitate inspection and maintenance of the monitor system 1 and as a check on the lamp 172, an LED 182 within the control box 80 also will be energized simultaneously with lamp 172 by a logic 1 signal at output port 183 and a corresponding logic 0 from inverting amplifier 184.

The lamp 173 and LED 185 are selectively energized simultaneously by logic 1 signals at output ports 186, 187, in the manner described with reference to lamp 172 and LED 182, to indicate that the monitor system 1 is operating in a rip detect mode. In a similar manner the lamp 174 and LED 188 may indicate that the monitor system 1 is operating in the override mode with the conveyor belt system 2 running without rip detector protection. The lamp 175 and LED 189 emit light whenever an antenna has been detected by the monitor system; a brief logic 1 pulse signal, the length of which depends on the speed the program information in EPROM 102 is being executed, is produced at the output port 190 of RAM 104 to trigger a one-shot multivibrator 191 that extends the pulse duration. For the extended duration a logic 1 signal on line 192 energizes the lamp 175 and LED 189.

In the failure-indicating portion 171 LED's 193-196 may be energized through respective inverting amplifiers 197-200 in response to logic 1 failure signals produced under software control at respective output ports of the RAM 104. The LED's 193-196 respectively indicate failures in the oscillator 30, detector amplifier 32, counter 36, and motor control relay 23. For example, when the monitor system 1 does not receive a logic 1 signal at input ports 141 or 145 of the RAM 104, the LED's 196 or 193, respectively, will be energized to indicate a failure at the motor control relay 23 or oscillator 30. The LED 194 will be energized whenever a test pulse signal is delivered on line 154 to energize the detector amplifier 32 but the latter fails to produce an event detect signal on line 34. The counter failure LED 195 will be energized when the count value on bus 39 fails to change within a selected period of time when the conveyor belt system 2 is supposed to be operating. Such period of time may be short or long, depending on the usual frequency of the pulse train from the tachometer 35 during steady state operation of the conveyor belt system 2.

Also in the failure indicating portion 171 are four additional LED's 201-204 in the control box 80 and a pair of externally visible lamps 205, 206. The LED's 201, 202 are connected via respective inverting amplifiers to the Q and $\overline{Q}$ outputs 157, 158 of the one-shot multivibrator 156. When the Q and $\overline{Q}$ outputs 157, 158 are at logic 1 and logic 0, respectively, indicating that the CPU 101 is operating properly, the LED 201 will be energized to emit light indicative of such proper operation and the LED 202 will be de-energized. However, in the event of a failure in the CPU 101, such that the Q and $\overline{Q}$ outputs 157, 158 are at logic 0 and logic 1, respectively, the LED 202 will be energized to emit light indicating the failure and the LED 201 will be deenergized.

The LED 203 and lamp 205 are selectively energized simultaneously via inverting amplifiers 209, 210, and in the case of the lamp 205 also via a dual-in-line package relay 211, to indicate a circuit failure in the monitor system 1. A dual input NOR gate 212 has one input connected to an output port 213 of the RAM 104 and another input connected to the $\overline{Q}$ output 158 of the one-shot multivibrator 156. Whenever either input to the NOR gate 212 is a logic 1 signal, a logic 0 output signal is inverted by a further NOR gate 214 and by the inverting amplifiers 209, 210 to energize the circuit failure indicating LED 203 and lamp 205. The CPU 101 will cause the RAM 104 to produce a logic 1 signal at the output port 213 whenever a circuit failure is detected in the monitor system 1, such as a failure of the oscillator check signal at input port 145, and the other input to the NOR gate 212 will, of course, be a logic 1 level when the one-shot multivibrator 156 times out as an indication of a failure in the CPU 101.

The LED 204 and lamp 206 are selectively energized simultaneously to indicate that the conveyor belt system 2 has been stopped by the monitor system 1. In particular, whenever a logic 1 stop signal is produced at the output port 162 of the RAM 104, the inverting amplifier 215 energizes the LED 204 and the inverting amplifier 216 and dual-in-line package relay 217 energize the lamp 206.

Turning now to FIG. 9, the oscillator 30 and its directly associated circuits are illustrated. The oscillator 30 preferably includes a stable crystal controlled oscillator 218 that produces a radio frequency signal (rf), for example, on the order of about 200 KHz and an output circuit 219. Other types of oscillators or circuits for generating AC signals at radio frequency or other frequency may equivalently be used depending, of course, on the particular application of the monitor system 1, the transducer technique employed for event sensing purposes and so on. The rf is provided by oscillator 218 at on line 220 and is capacitively coupled by a capacitor 221 to resistors 222, 223, which form a voltage divider in the output circuit 219. The junction of resistors 222, 223 is connected to the non-inverting input of a conventional buffer drive amplifier 224 of the output circuit 219, and the inverting input of that amplifier and the remote terminal of the resistor 223 are connected by line 225 to a source of ground reference potential. The buffer amplifier 224 produces an AC drive signal which is delivered by output line 226 to one or more transmitter plates 12 at one or more respective rip detector stations 11.

The AC drive signal also is coupled by line 227 to the input of the filtered half-wave rectifier 142 and, via an adjustable potentiometer 229, to the test pulse switch 151. The filtered half-wave rectifier 142 includes a capacitive coupling input capacitor 230, an input resistor 231, a rectifier diode 232, a resistor 233, and a filter capacitor 234. The filtered half-wave rectifier 142 or a functionally equivalent circuit produces at the junction 235 of the resistor 233 and the capacitor 234 a substantially DC signal whenever an AC drive signal is produced by the buffer amplifier 224. A transistor 236, which is connected to the junction 235, is biased conductive by such a substantially DC signal to deliver a DC output signal at line 145, which is coupled to an input port of the RAM 104 as an indication of proper oscillator operation. A zener diode 239 coupled in the emitter circuit of transistor 236 limits the voltage thus produced on the line 145 as an indication of proper oscillator 30 operation. Preferably the capacitor 234 is sufficiently large to be relatively slow in discharging; therefore, a brief interruption of the AC drive signal will not be sensed by the computer 26.

The test pulse switch 151 includes a control circuit 240 and a high-level isolation analog switch 241. The control circuit 240 receives a logic 1 test signal on line 152 from the RAM 104 when it is desired to deliver a test pulse signal to the detector amplifier 32. The control circuit 240 includes an inverting amplifier 242, resistor 243, transistor 244, resistor 245, and a pair of inverting amplifiers 246, 247. Each of the inverting amplifiers 246, 247 may comprise part of an integrated circuit model No. 4049B. In the analog switch portion 241, according to the preferred embodiment, a model No. 4066 analog switch having four discrete analog switches 248-251 is employed. Each discrete analog switch has a single control terminal identified by the letter C and a pair of bi-directional input/output terminals, such as 248i, 248o. The integrated circuit analog switches receive Vcc power through terminals 252, 253, the latter being coupled to a supply of ground reference potential.

During operation of the switch 151 when it is intended to pass an AC test pulse signal to line 154 for checking operation of the detector amplifier 32, a logic 1 signal is delivered from the RAM 104 via line 152 to the inverting amplifier 242. The transistor 244, then, is cut off, and the inverting amplifiers 246, 247 produce a logic 1 control signal on line 255 to complete circuits between the respective input/output terminals of series connected discrete analog switches 248, 249. A portion of the AC drive signal, then, is provided via the potentiometer 229, a further resistor 255 and switches 248, 249 to line 154 as a test pulse signal for the detector amplifier 32 to check operation thereof, as aforesaid. At this time the signal on line 256 is a logic 0 to maintain the switches 250, 251 open. However, when it is desired to cut off delivery of the test pulse signal from line 154, a logic 0 signal on line 152 from the RAM 104 causes conduction in the transistor 244 and, accordingly, logic 1 and logic 0 signals to be produced on lines 256, 254, respectively. The logic 0 signal on line 254 opens the switches 248, 249, and the logic 1 signal on line 256 closes the switches 250, 251 to couple the input/output terminal junction 257 of switches 248, 249 and line 154 to a source of ground reference potential via line 258.

Accordingly, the test pulse switch 151, and particularly, the analog switch portion 241 thereof, provides a high degree of isolation between the AC drive signal and line 154 to the detector amplifier 32 in order to obtain a high degree of reliability that the AC drive signal will not improperly leak to the detector amplifier. Such isolation is obtained, first, by the series connection and parallel control of the discrete analog switches 248, 249 to effect a redundant cut off of any AC drive signal. The isolation is further enhanced by the affirmative connection of line 154 and junction 257 to the source of reference potential at line 258 to conduct any AC signal at line 154 or junction 257 to ground rather than to the detector amplifier 32.

Referring now to FIGS. 10A–10F, a flow chart representing the best mode of operating the monitor system 1 in conjunction with a conveyor belt system 2 will be described with reference back to FIGS. 1–8. It will be appreciated, however, that other modes of operaton of the monitor system may be employed, depending, for example, on the type of process being monitored thereby, the type of input information and output controls available, etc. Moreover, it will be appreciated that the information presented in the flow chart of FIGS. 10A–10F may be reduced in conventional manner by a person having ordinary skill in the art to computer program language that may be stored, for example, in the EPROM 102 to effect overall control of the microcomputer 100 and, therefore, the monitor system 1.

For purposes of the following description, it will be assumed that the monitor system 1 may operate in an antenna counting mode first to count the number of antennas 10 in the belt 3. Thereafter, the monitor system 1 may operate in a program mode to build the table of information indicating the relative interval distances between adjacent pairs of antennas. Moreover, with the table completed, the system 1 may operate in a rip detect mode. Several sub-routines, which are described in terms of their general functions, are included in the flow chart, and several failure modes such as a broke mode and a fail mode will be described in connection with FIG. 10F.

Upon receiving a start signal, block 300 (FIG. 10A), the system 1 loads the stack pointer, block 301, a function required for proper operation of an Intel Corporation Model 8080 microprocessor, this being used as the CPU 101. Several initialization steps are employed, including, for example, defining of port directions, block 302, since in the preferred embodiment certain hardware, namely RAMS 103, 104, uses programmable ports, although this step may be eliminated if hardware with fixed ports is used. Also, the various outputs from the microcomputer 100 are initialized, block 303, for example, to extinguish the various lights in the output indicators portion 24, and then to pulse the watchdog timer multivibrator 156 by a watchdog signal on line 159 to energize the LED 201 and to operate the motor control relay 23 to start the motor 6 to move the belt 3.

The diagnostics portion 22 tests the detector amplifier 32 by sending a test pulse signal thereto, block 304. If no event detect signal is produced on line 34 in response to the test pulse signal line 305 is followed to a fail mode described below; the designation N meaning a no or negative answer to an inquiry. If a proper event detect signal is sensed on line 34, the letter Y indicating a yet or affirmative answer, the antenna lights, namely lamp 175 and LED 189, and the detect mode lights, namely lamp 173 and LED 185, are pulsed. Sensing the event detect signal, then, allows the flow chart to proceed to block 306, whereupon the mentioned lights are extinguished, and the monitor system 1 enters an antenna counting mode, block 307, whereupon the HL register pair in the microprocessor 101 is set to a zero value to await the first antenna to be sensed by the receiver plate 13 and the amplifier 32.

Upon entering the antenna counting routine, block 308, the relay 23 and oscillator 30 are tested; the CPU 101 reads the relay check and oscillator check signals at input ports 141, 145 to the RAM 104, and if either of these check signals is a logic 0, the flow chart, according to line 309, goes to the fail mode. If both check signals are logic 1, the watchdog timer multivibrator 156 is pulsed, block 310, and the CPU 101 inquires whether the rezero display button 119 is pushed, block 311. If button 119 is pushed, according to line 312 and block 313 the HL register pair in the CPU 101 is set to zero, and a display subroutine, block 314, is called to latch into the latch circuit of the display 27 via the keyboard/display controller 122 the value stored in the HL register pair, namely zero. According to line 315, then, the antenna counting routine is continued through blocks 308, 310, 311.

If the rezero display button 119 is not pushed, block 311, the CPU 101 inquires whether the program button 116 is pushed, block 316; if button 116 is not pushed, the CPU 101 inquires whether an antenna is present, block 317, by looking whether any detect signal is on line 34. If no antenna is present, the microcomputer 100 continues in a loop following lines 318 and 319 until an antenna is found, block 317. Thereafter, for noise elimination, a short delay of, for example, 20 milliseconds, block 320, is waited and the CPU 101 again checks whether an event detect signal is at line 34, block 321. If there is no event detect signal then, it means that the detector amplifier 32 simply received a noise signal from the receiver plate 13 or internally, and the flow chart continues in a loop following line 322 and 319. However, if an antenna is sensed at block 321, the antenna lights 175, 189 are pulsed, block 323, and the HL pair is incremented by 1, block 324. The display subroutine, block 324, also is called to increment the values stored in the latch circuits that drive the display elements of display 27 so that the value indicated thereon represents the number of antennas counted thus far in the method. At block 325 a further delay is provided to avoid sensing again the just detected antenna, and according to lines 326, 319, the flow chart continues in its antenna counting mode loop. Operation of the monitor system 1 in the antenna counting mode will be continued, for example, until the belt 3 has moved through one complete cycle whereupon the value shown in the display 27 will indicate the total number of antennas in the belt.

When the program button 116 is pushed, block 316, according to line 327 and block 328 the program mode lights 172, 182 are energized to indicate operation of the monitor system 1, then, in the program mode. In the program mode the microcomputer 100 builds the table of information concerning the relative distance intervals between pairs of adjacent antennas. It is assumed according to the following description that the number of antennas in the belt 3 is known, having been counted according to the antenna counting mode of operation just described.

Upon pushing the program button 116, zeros will be written to all of the display digits in the display 27, block 329. The keyboard/display controller 122 enables the keyboard 123, block 330, to receive information representing the total number of antennas in the belt 3 each time a digit or character is pressed in the keyboard 123, if it is not an error or cancel digit key, block 331, and if it is not a begin programming mode key, block 332. According to block 333 each of the digits already on the display is shifted one place to the left, and the character just pressed is entered in the least significant digit position. However, if a cancel digit key is pressed, block 331, the display contents are shifted once to the right destroying the least significant digit, block 334. If the begin programming key on the keyboard 123 is pressed, block 332, then the program mode commences at block 335.

The information displayed by the display 27 is converted to a primary number which is stored in the HL register pair and in a location in one of the RAM's 103, 104, block 335. Moreover, the offset window of error half-size, block 336, value e is defined and stored in one of the RAM's. Such window half-size e may be generated, for example, by a series of thumbwheel switches or by a further keyboard entry, etc. In selecting a magnitude for the offset value e, the larger the spacing between adjacent antennas, the larger may be the value of the offset value e; for accuracy, moreover, the number of pulses produced by the tachometer 14 per revolution of the drive roller 7 and the diameter of the latter also should be considered—the larger the number of pulses, the larger the window, and conversely. Typical thumbwheel switches 337 for delivering the offset window half-size e to the CPU 101 are illustrated in FIG. 8.

To keep track of the number of antennas remaining to be counted in a complete cycle of the monitor system 1 and conveyor belt 3, the value stored in the HL register pair, which is the number of antennas in the belt 3, is stored in a wire counter location in one of the RAM's 103, 104, block 338. The wire counter value represents one less than the number of antennas that will have to be counted. In block 339, the table pointer is placed in the HL register pair of CPU 101, such table pointer value will indicate the location in the RAM 103, for example, of the first table location 71 of table 70 (FIG. 6).

At block 340 a search subroutine is called to operate the monitor system 1 to look for an antenna pulse. In the search subroutine the monitor system 1 periodically pulses the watchdog timer multivibrator 156, periodically checks to assure that the count value on the counter 36 has changed within a predetermined time, and reads the relay and oscillator check signals at input ports 141, 145 of the RAM 104 to assure proper operation of the motor control relay 23 and oscillator 30. The flow chart will come out of the search subroutine, block 340, upon finding an antenna, block 341, sensing a tachometer failure, block 342, or sensing another failure, block 343, for example of the relay 23 or oscillator 30. In the search subroutine, block 340, a status word is developed and written into the accumulator of the CPU 101. When bit 0, 1 or 2 of the status word becomes a logic 1, it indicates the reason for coming out of the search subroutine. For example, if bit 1 of the accumulator is logic 1, indicating a tachometer failure, the flow chart moves according to line 344 to the broke routine described below; and if bit 2 of the accumulator is logic 1, block 343, indicating another failure sensed in the search subroutine, according to line 345 the flow chart moves to the fail routine described below.

However, if during the search subroutine, block 340, the detector amplifier 32 produces an event detect signal properly indicating a sensed antenna, bit 0 of the accumulator in CPU 101 is made logic 1 in the search subroutine, block 340. According to block 341 and line 346 the system briefly waits, block 347, so as not to find the same antenna again and then proceeds according to line 348 to pulse the antenna lights, block 349, indicating an antenna has been detected. Upon so detecting the antenna the current count on the counter 36, which indicates where the antenna has been found, is stored, block 350, in a last count memory location in one of the RAM's 103, 104. The twos complement of the value stored in the last memory count location is calculated and stored in one of the RAM's, block 351. The table pointer in the HL register pair in the CPU 101 is still designating the first memory location 71 in the table 70.

Figure 10C:
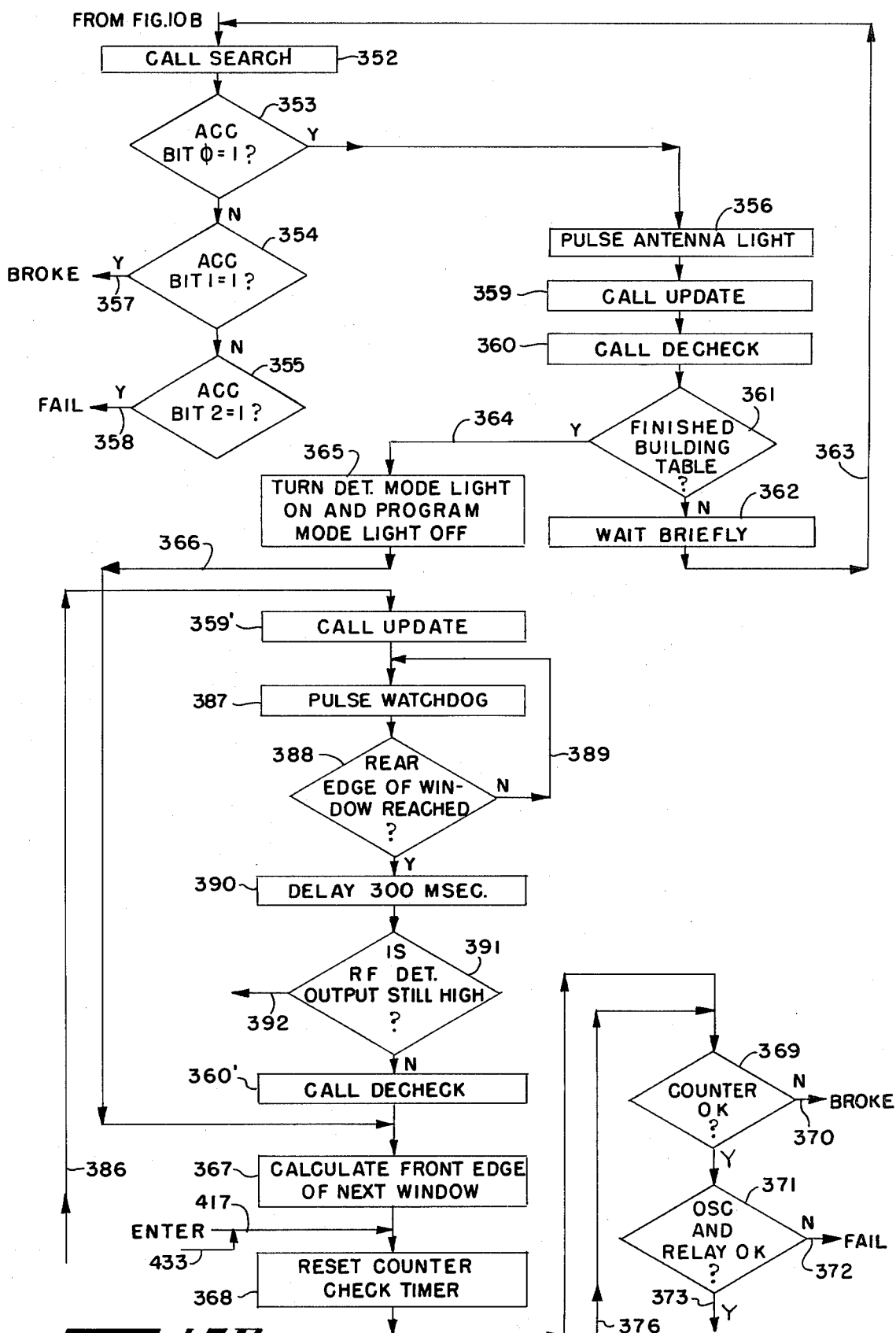

The search subroutine is called again, block 352, in FIG. 10C. According to the accumulator status word bits 0, 1 or 2, blocks 353, 354, 355, the flow chart will come out of the search subroutine, as above. The antenna light will be pulsed, block 356, upon sensing the next antenna in the belt. Alternatively, the flow chart will go to broke or fail routines, according to lines 357, 358, respectively, as above. Assuming that the next antenna has been found, block 353, and the antenna lights have been pulsed, block 356, an update subroutine, block 359, is called. The update subroutine, block 359, takes the current value from the counter 36 and adds the twos complement value stored in the last count memory location to obtain a number having magnitude directly representing the distance between the first and just-detected antennas. This distance value is stored in the first location 71 in the table 70 as directed by the table pointer in the HL register pair. Moreover, the update subroutine stores the present count value on counter 36 and the twos complement thereof in the last count memory location mentioned above for subsequent use.

After the update subroutine, block 359, has been completed, a decheck subroutine, block 360, is called. The decheck subroutine retrieves the wire counter value from its location in memory and questions its value. If the wire count value is not 0, it is decremented by 1. Then, the decheck subroutine increments the number stored in the HL register pair to address the next memory location in the table 70. However, if the wire counter value is 0, the decheck subroutine sets an end of table flag and puts the table pointer in the HL register pair to the beginning of the table to point or address the first memory location 71 of the table 70. If building the table has not yet finished, block 361, namely the wire count value has not reached 0 prior to the immediately preceding decheck subroutine, block 360, then after a brief wait, block 362, to assure that the sensed antenna has passed the rip detector station, the program mode continues in its loop following linr 363 back to the search subroutine at block 352, and so on. If the wire count value is at 0 at the start of the decheck subroutine, block 360, then the table is finished, and according to block 361, line 364 is followed to enter the rip detect mode of operation, block 365, at which time the detect mode lights 173, 185 are energized and the program mode lights 172, 184, are deenergized.

It is noted here, according to the best mode, when the program 116 and detect 117 buttons are used to effect, respectively, operation of the system 1 in program and rip detect modes, the rezero display button 119 and its associated circuitry 113, as well as the portions of the flow chart from block 309 through line 327, as described above, may be eliminated. Rather, upon pushing the program button 116, the flow chart will pass through blocks and lines 300-307 directly to block 328 of FIG. 10A to enter the program mode of operation.

Rather than writing the wire counter value from the display 27, the wire counter value will be accumulated and developed as the antennas in the belt are counted, for example, by modification of the program routine described above, during one complete cycle of operation of the belt 3. When the detect mode button 117 is pushed or, alternatively, if the program mode button 116 is pushed again at the completion of a belt cycle, then, the wire counter value will be known, the table will have been finished, for example, as at block 361, and the flow chart will proceed via line 364 and block 365 into the detect mode of operation.

Upon entering the detect mode of operation through line 366, the front edge of the next window is calculated, block 367. In particular, the HL register pair is pointing to the first element 71 in the table 70. The count value stored in memory location 71 is added to the current count value on the counter 36, and the offset value e is subtracted therefrom to indicate at what value on the counter 36 the monitor system 1 should begin looking for an event detect signal on line 34. A subroutine "reset counter check timer", block 368, initializes the various registers in the CPU 101, for example, to operate the diagnostics 22 to check whether the counter 36 and tachometer 14 are operating properly. If there is no change in the count value of the counter 36 a prescribed period of time after being so initialized, block 369, according to line 370 the flow chart moves to the broke mode described below. If the counter is operating satisfactorily, block 369, the relay 23 and oscillator 30 are checked, block 371, by reading input ports 141, 145 to the RAM 104; if either of those ports receives a logic 0, the system follows line 372 to the fail mode described below. However, if both input ports 141, 145 are at logic 1, line 373 is followed to pulse the watchdog timer multivibrator 156, block 374. If the front edge of the window has not yet been reached, block 375, the flow chart follows line 376 through a loop back to the diagnostics checking portion, blocks 369, 371 and 374.

When the front edge of a window is reached, block 375, the rear edge of the window is calculated, block 377. Such rear edge calculation is effected by adding the value 2e to the counter value when the front edge is detected. The diagnostics blocks 368', 369', 371', and 374' are followed, as above with reference to the unprimed blocks of the same respective reference characters. If an antenna is not yet present at the rip detector station 11, block 378, the microcomputer 100 inquires whether the rear edge of the window has been reached, block 379. If the rear edge has not been reached, line 380 is followed to continue a loop that effects diagnosis, as above, and continues watching for an antenna. If an antenna has been detected, block 378, there is a delay of about 20 milliseconds, block 381, and at block 382 the microcomputer 100 again looks to see whether an antenna is present at the station 11. If no antenna is present after such second look, it is presumed that the earlier sensed antenna was just electrical noise and the system flows via line 383 back to the beginning of the antenna sensing loop 384.

If an antenna is sensed for the second time, block 382, then the antenna lights 175, 189 are pulsed via the one-shot multivibrator 191, block 385, and the system proceeds via line 386 to call the update subroutine, block 359', which performs the same functions described above with reference to the block 359. More specifically, the current value of the counter 36 when the antenna is found is added to the twos complement of the last count, i.e. the twos complement of the counter value when the previous antenna had been found, to obtain the distance between the adjacent antennas. This distance information is stored in the location at which the table pointer of the HL registered pair is pointing, thus refreshing the table. Then the count value on the counter 36 when the most recent antenna was found is stored and its twos complement is taken. Thereafter, the watchdog timer is pulsed, block 387, and the system looks to see whether the rear edge of the window is reached, block 388. If the rear edge has not been reached, the system continues in a loop, via line 389 until the rear edge is reached.

When the rear edge of the window in which the most recent antenna had been found is reached, block 388, a delay of 300 milliseconds, block 390, is waited to assure that the window is well passed and to provide adequate time for the detector amplifier 32 to reset itself so that no event detect signal is produced on line 34. However, if after the wait provided at block 390 an event detect signal is produced on line 34 by the detector amplifier 32, block 391, this indicating a failure in the system 1, the system follows line 392 into a fail mode described below. If, after the wait provided in block 390, the event detect signal is eliminated from line 34, the decheck subroutine, block 360', which is the same as block 360 above, is called. The wire counter value is retrieved from memory. If the wire counter value is not 0, it is decremented by 1 and the HL register pair table pointer is incremented by 1 memory location. Alternatively, if the wire counter value is 0, the table pointer of the HL register pair is reset to point back to the beginning of the table and the wire counter value is set back to its maximum value. Thereafter, the program flows to block 367 to calculate the front edge of the next window and so on, as aforesaid.

Figure 10D:
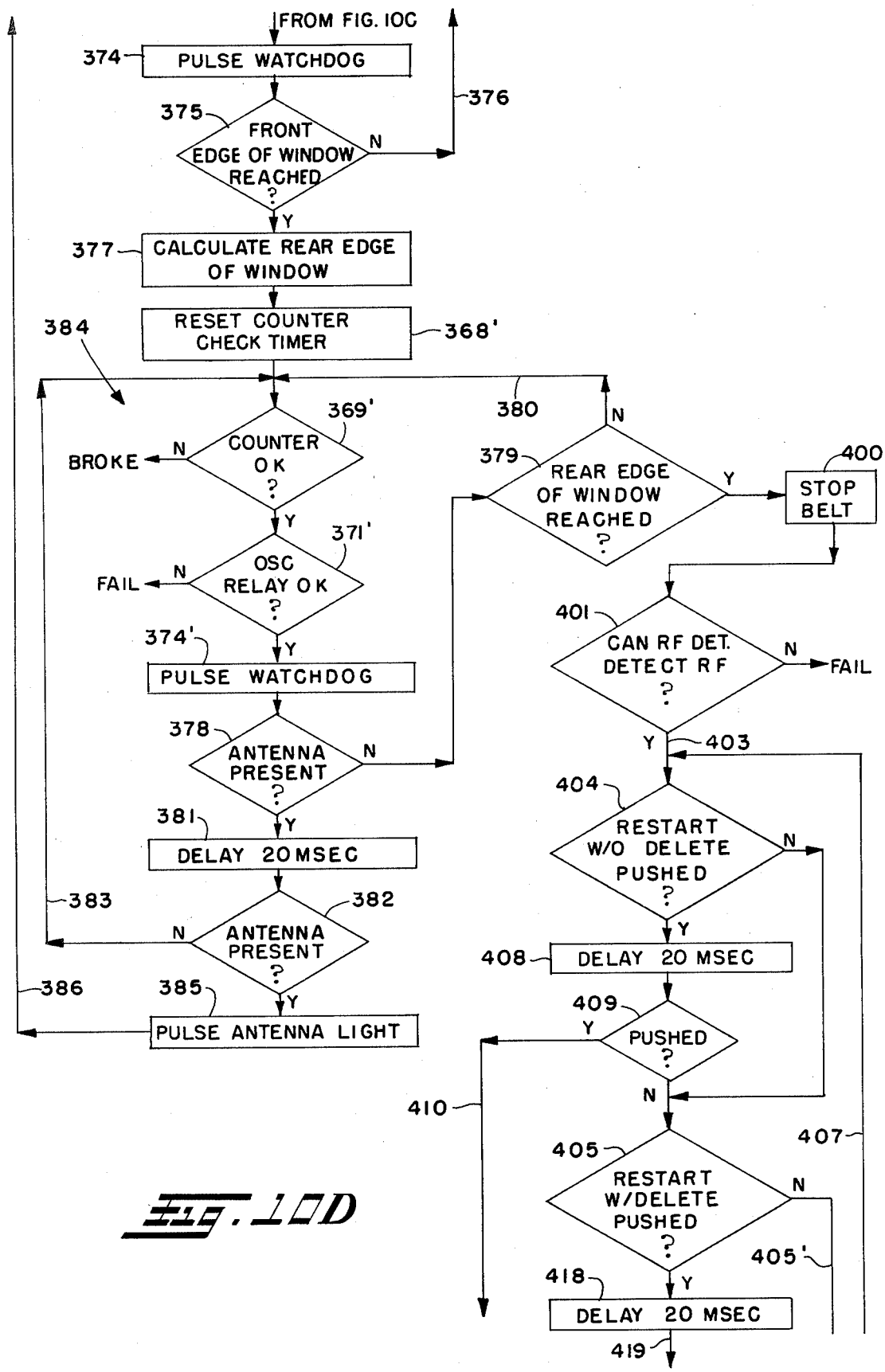
Figure 10F:
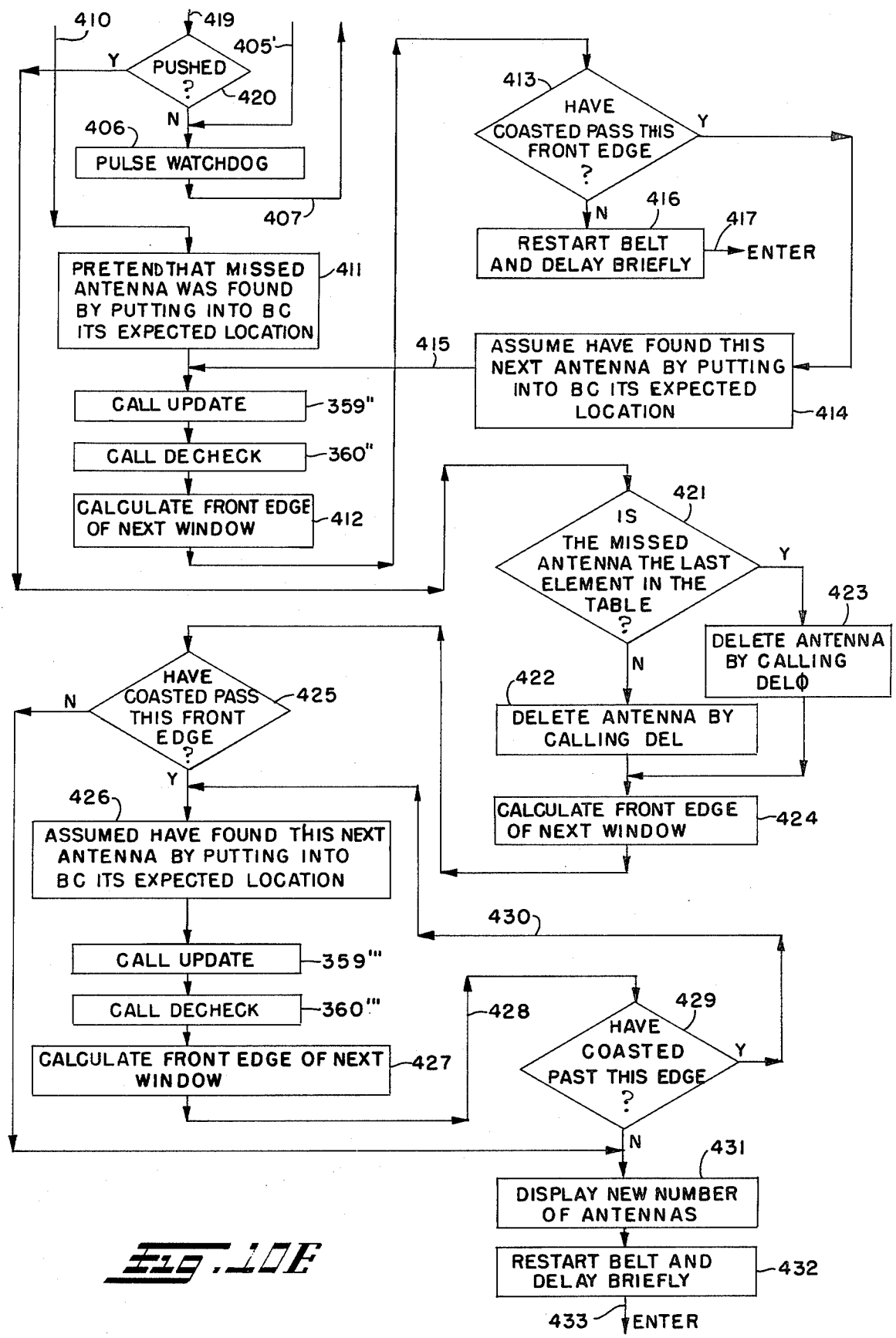
Figure 10F:
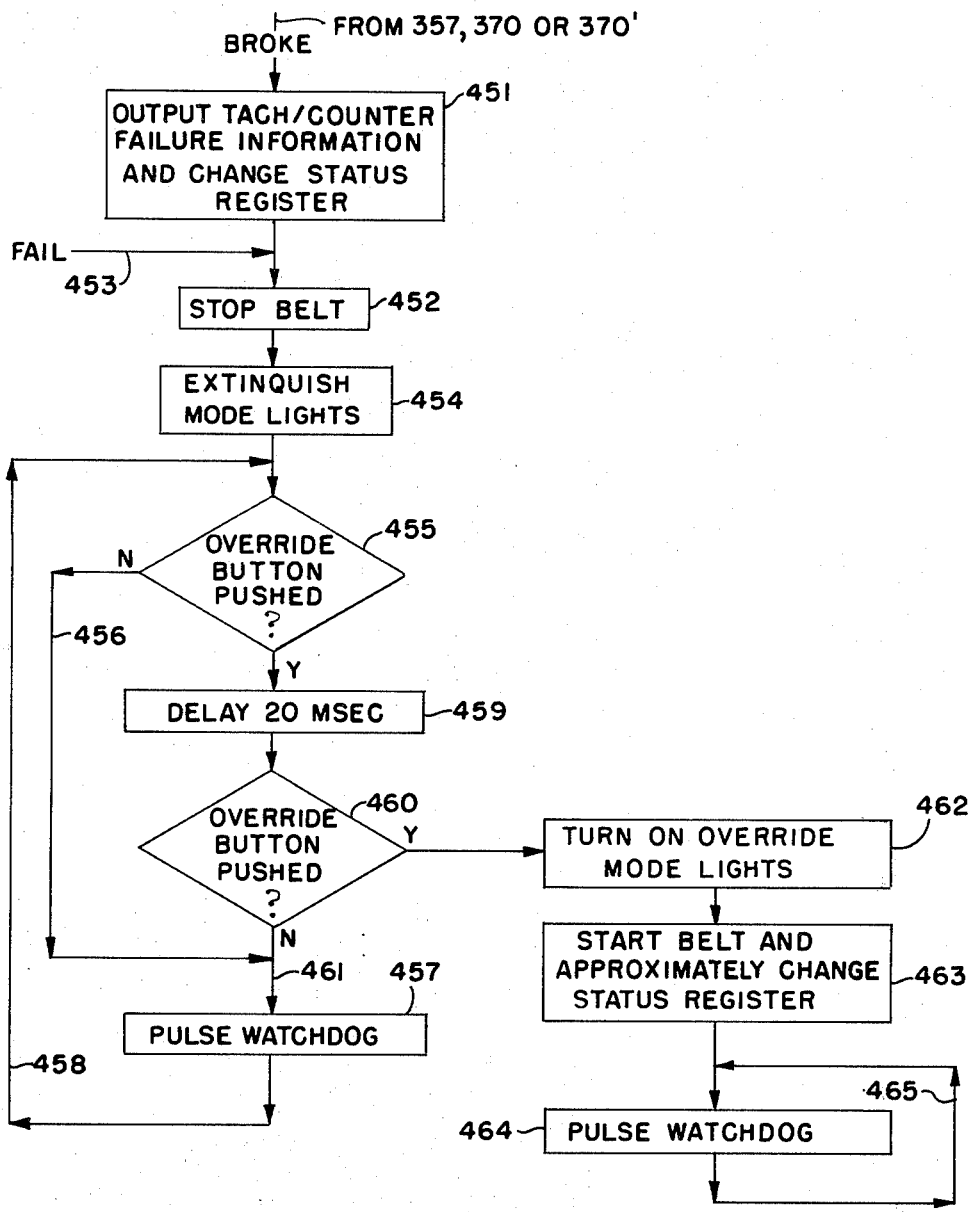

Turning to FIG. 10D, if the rear edge of a window is reached, block 379, before an antenna is detected in a given window of error, the system stops the belt, block 400, by applying a logic 0 at RAM 104 line 162. The diagnostics portion 22 then operates to close the test pulse switch 151 to pass a test pulse signal on line 154 to the detector amplifier 32 to check operation of the latter, block 401. If no event detect signal is produced on line 34 then, the flow chart follows line 402 to the fail mode described below. However, if the detector amplifier 32 does produce in response to the test pulse signal, a correct event signal, line 403 is followed to enable operation of the monitor system 1 in one of its restart or override modes described further below.

To effect a restart or override the system 1 checks whether the restart without delete button 121 is pushed, block 404; if not, whether the restart with delete button 118 is pushed, block 405; if not, line 405' is followed and the watchdog timer one-shot multivibrator 156 is pulsed, block 406 (FIG. 10E). A loop completed by line 405 is followed to continue watching for pressing of one of those several buttons. If the restart without delete button 121 is pushed, block 404, then a 20 millisecond delay, block 408, is waited effectively to provide a debounce function assuring that the sensed closure of switch 121 is not simply a noise signal. After that delay, block 408, the microcomputer 100 again looks to see whether the button 121 is pushed, block 409; if not, the system continues in its loop through blocks 405, 406, 407 and 404, as aforesaid, to look for a valid restart or override signal. However, if after waiting the 20 millisecond delay, block 408, the restart without delete button 121 is pushed, block 409, then line 410 is followed into FIG. 10E.

At block 411 the microcomputer 101 effectively pretends that the missed antenna was found by putting into the BC register pair of the CPU 101 a value representing the value that should have been on the counter 36 upon sensing the missed antenna. This value placed in the BC register pair is obtained, for example, by adding the value in the memory location to which the table pointer in the HL register pair is pointing to the counter value in the last count memory location, which represents the count value of the counter 36 when the previous antenna was sensed. Thereafter, the update subroutine 359" and decheck subroutine 360" are called to perform their above-described functions. The front edge of the next window is calculated, block 412, and a comparison is made with the present count value on counter 36, block 413, to inquire whether the belt 3 has coasted past the calculated next front edge. If the belt has coasted past that next front edge, according to block 414, it is assumed that the next antenna has been found by putting into the BC registered pair of the microprocessor or CPU 101 the expected location of the next antenna in the manner described above with reference to block 411, and line 415 is followed to complete a loop until it is determined that the belt has no longer coasted past the next calculated front edge. Then, the flow chart continues according to block 416 to restart the belt 3 by closing the relay 23. After waiting a brief delay period to overcome transient conditions during restarting of the belt, according to line 417 the flow chart returns to the enter location prior to block 368 of FIG. 10C. Thereafter, the flow chart continues as above while the monitor system 1 operates in its detect mode of operation.

Assuming that the restart with delete button 118 is pushed, as sensed at block 405 (FIG. 10D), a 20 millisecond debounce period is waited and the system follows line 419 to recheck that such button 118 is pushed, block 420 (FIG. 10E). The flow chart then inquires whether the missed antenna was the last element in the table 70, block 421. If the missing antenna was not the last element in the table 70, then information concerning that specific missed antenna is deleted by calling a subroutine DEL, block 422. In the DEL subroutine the procedure outlined above with reference to the table correction in conjunction with FIG. 6 occurs. For example, assuming that the sixth antenna was missed and is to be deleted, the value E from memory location 72 in table 70 of FIG. 6 is added to value F from memory location 73 to obtain value E' in memory location 72". Moreover, each of values G–M is moved up one memory location, as aforesaid, to avoid leaving any holes in the table.

Alternatively, if the missed antenna at block 421 is the last antenna in the table 70, for example, of FIG. 6, then a subroutine called DEL 0 is called, block 423. In this DEL 0 subroutine it is assumed that the thirteenth antenna, for example, which is a distance M from the first antenna, is missing. The value M, then, is added to the value A in table 70 of FIG. 6, and the table pointer in the HL register pair is reset to point to the first location 71 of the table. Furthermore, the subroutine DEL 0 decrements the maximum wire counter value by 1 and then resets the wire counter value to that decremented maximum value.

After the information concerning the missing antenna has been so deleted either according to block 422 or block 423, the front edge of the next window is calculated, block 424. Inquiry is made whether the belt 3 has coasted past this calculatd front edge, block 425. If the belt has coasted past the calculated front edge, then it is assumed at block 426 that the next antenna has been found by putting into the BC register pair the counter value of such expected antenna, and the update and decheck subroutines are called, blocks 359''', 360'''. Thereafter, the front edge of the next window is calculated, block 427, and following line 428 an inquiry is made at block 429 to see whether the belt 3 has coasted past this subsequently calculated; if so, then line 430 is followed to recalculate the front edge of the still next antenna, and so on. However, if at block 425 or at block 429 it is found that the belt 3 has not coasted past the calculated front edge, then the new number of antennas in the belt is displayed in the display 27, block 431. If the display 27 is not employed, then block 431 is eliminated and the flow chart proceeds to block 432, whereupon the belt is restarted and a brief delay period is provided to eliminate the effect of transient conditions during restart of the belt. After that delay period, according to lines 433 and 417, the flow chart moves back to the enter location between blocks 367 and 368 of FIG. 10C so that the operation of the monitor system 1 continues according to the flow chart, to operate in its rip detect mode.

The RAM 104 controls the failure indicating portion 171 of the output indicators portion 24 in FIG. 8. In particular, logic signals produced at the lower seven output ports 450 of the RAM 104 controlled by the CPU 101. Bits 0,1 and 2 are provided respectively, at output ports 162, 159, 213 of RAM 104 and the remaining four bits are provided at the next four vertically spaced output ports of the RAM 104 to control the LED's 193–196. The status word ordinarily is contained in a status register in the RAM 104, and the logic signal level of those bits is changed according to detected failures in the monitor system 1. Bit 1 at output port 159 periodically is pulses as the watchdog signal during proper operation of the microcomputer 100.

When bit 0 of such status word is a logic 0, the relay 23 may be closed to start the belt 3, and when bit 0 is a logic 1, the belt is stopped and the LED 204 and lamp 206 are energized to indicate such stoppage. Bit 1 receives the periodic watchdog signal at output port 159 to effect control through the watchdog timer multivibrator 156 of the LED's 201, 202 and, in the event of a timing out of the multivibrator 156, a de-energizing of the relay 23 to stop the belt. Moreover, such stoppage is sensed by the RAM 104 and CPU 101 as the belt check signal at input port 133 and relay check signal at input port 141 become logic 0, whereupon bit 0 of the status word at output port 162 becomes a logic 1 to prevent restarting of the belt. The third bit of such status word at output port 213 is normally a logic 0, but it will become a logic 1 failure indication if the relay check signal at input port 141 becomes a logic 0 when the relay 23 is supposed to be energized. The third status word bit at output port 213 will operate through the NOR gates 212, 214 to effect energization of LED 203 and lamp 205. The other four status word bits from the upper four output ports 450 normally will be logic 0 but will be logic 1, respectively, when a failure occurs in the oscillator 30, detector amplifier 32, counter 36, or motor control relay 23 to effect energization of one of the visual indicating LED's 193–196 in the failure indicating portion 171.

Turning back to FIG. 10F, when the flow chart is directed to the broke routine, for example via lines 357, 370 (FIG. 10C) or 370' (FIG. 10C), at block 451, the fact that the count value of the counter 36 had not changed within a predetermined time is realized; this fact represents a failure of the counter 36 or tachometer 14 and is transferred to the RAM 104 which changes bit 4 of the status word produced at output ports 450 to effect energization of the LED 195. The belt 3 then is stopped, block 452. Such stopping is effected readily by adding 1 to the status word, which causes bit 0 thereof at output port 162 to become a logic 1 opening the relay 23 to stop the belt.

The flow chart also flows to block 452 to stop the belt through the fail routine, i.e. line 453, for example via lines 304, 309 (FIG. 10A), et al. The principal difference between entering the block 452 through the broke entrance and the fail entrance is that in the former the diagnostic capability is provided by software and in the latter by hardware alone or in combination with software. In broke the software monitors the count value of the counter 36; upon sensing a failure there is a need to take an active step of changing bit 4 of the status word at output ports 450 to energize LED 200. Entry to block 452 via the fail line 453 occurs after a hardware circuit portion of the diagnostics 22 has sensed a failure condition and already caused a change in a respective bit of the status word at ports 450 to indicate the failure.

Upon stopping the belt at block 452, the mode lights in the mode indicating portion 170 are extinguished, block 454, and an inquiry is made to sense whether the override button 120 (FIG. 8) has been pushed, block 455. If the override button has not been pushed, the flow chart continues in a loop following line 456; the watchdog timer multivibrator 156 is pushed with a watchdog signal, bit 1 of the status word, at output port 159, block 457; and the flow chart continues in its loop via line 458 back to block 455. However, if the override button 120 is pushed at block 455, a 20 millisecond delay, block 459, is waited for debouncing purposes, and the microcomputer 100 then looks again to see whether the override button is pushed, block 460; if not, the flow chart follows line 461 to pulse the watchdog timer, block 457, and to continue back in the waiting loop following line 458. If the override button 120 is validly pushed, the override mode lamp 174 and LED 188 are energized, block 462. Bit 0, at output port 162, of the status word is changed back to logic 0 to start the belt 3, block 463, and the flow chart then enters a loop trap, including block 464 and line 465, periodically to pulse the watchdog timer multivibrator 156 until the monitor system 1 deliberately is taken out of override mode, for example, by an inspector who would press one of the buttons in the user commands portion 25 in the control box 80. Moreover, a stop switch 466 (FIG. 8) may be mounted on the cover 82 of the control box 80 and may be pushed to stop the belt 3 at any time regardless of the instant mode of operation of the monitor system 1.

STATEMENT OF INDUSTRIAL APPLICATION

The monitor system 1 may be employed, for example as aforesaid, to monitor and to control a process in which a plurality of sequential events occur in a cyclical manner at selected known positions in the process while providing safe self-monitoring capability.

I claim:

1. A monitoring system for monitoring the occurrence of a plurality of events in a cyclical process, comprising: event transducer means for detecting the occurrence of such events in such process, progress transducer means for detecting the progress of such process, and search means for sensing whether respective events occur at expected positions in the progress of such process.

2. The system of claim 1, said event transducer means comprising detector means for monitoring the integrity of a conveyor and such process comprising cyclical operation of such conveyor.

3. The system of claim 2, said detector means comprising a conveyor belt rip detector.

4. The system of claim 2, said detector means comprising a transmitter and a receiver, and signal coupling means associated with such conveyor for periodically, according to the progress of such conveyor, coupling a signal from said transmitter to said receiver, as an indication of such event and, thus, of such integrity.

5. The system of claim 4, further comprising test means for checking operation of at least one of said transmitter and receiver to sense a failure therein and stop means for stopping such process in response to such a sensed failure.

6. The system of claim 5, further comprising means for producing a visual indication that said test means has sensed a failure.

7. The system of claim 5, further comprising means for stopping said conveyor when said test means senses a failure.

8. The system of claim 4, said transmitter comprising an AC signal producing oscillator, and further comprising test means for checking operation of said oscillator to sense a failure therein, said test means including a filtered half wave rectifier circuit for producing one signal when said oscillator is operating properly and another signal when there is a failure in said oscillator.

9. The system of claim 4, said transmitter comprising an AC signal producing oscillator, said receiver comprising an AC signal detector amplifier, and further comprising test means for checking operation of said detector amplifier to sense a failure therein, said test means including means for selectively delivering a checking AC signal to said detector amplifier and means for sensing whether in response to such checking AC signal said detector amplifier produces an appropriate output signal.

10. The system of claim 9, said means for selectively delivering comprising selectively operable analog switch means for passing to said detector amplifier at least a portion of such AC signal produced by said oscillator.

11. The system of claim 10, said analog switch means comprising a plurality of analog switches having control terminals coupled in parallel for simultaneous switch closing and opening in response to a common control signal and having input and output terminals in series connection for high signal isolation when said analog switches are open to minimize coupling such AC signal therethrough to said detector amplifier.

12. The system of claim 10, further comprising further analog switch means operative when said analog switch means is open for coupling any signal passing through the latter to a source of reference potential.

13. The system of claim 12, each of said analog switch means and said further analog switch means comprising plural analog switches all of which are part of a common integrated circuit package, each respective analog switch of said further analog switch means being connected to the output terminal of a respective analog switch of said analog switch means for coupling signals thereat to such source of reference potential.

14. The system of claim 12, further comprising control means for producing selective control signals to operate said analog switch means and further analog switch means to open and to close.

15. The system of claim 14, said control means comprising two inverting amplifiers connected in series such that in response to an input signal to a first one of said inverting amplifiers the output signals therefrom will be of opposite logical sense to each other, and connecting means for connecting one of said inverting amplifiers to said analog switch means and the other of said inverting amplifiers to said further analog switch means.

16. The system of claim 15, said means for sensing including means for selectively operating said test means to check said oscillator when the occurrence of an event is not sensed at an expected location.

17. The system of claim 9, said means for sensing including means for selectively operating said test means to check said oscillator when the occurrence of an event is not sensed at an expected location.

18. The system of claim 4, said transmitter comprising a radio frequency signal generator, said receiver comprising a radio frequency signal responsive detector, and said signal coupling means comprising plural antenna-like members at spaced locations said respect to said conveyor.

19. The system of claim 1, further comprising means for lengthening the apparent duration of such event.

20. The system of claim 19, such event being represented by production of an electrical pulse signal, and said means for lengthening comprising a one-shot multivibrator.

21. The system of claim 20, further comprising indicator means for producing a visual indication over the apparent duration of each such event.

22. The system of claim 20, said indicator means comprising two circuits connected for simultaneous energization by a common signal to produce normally redundant visual information, one of said circuits including light emitting diode means for low voltage energization, the other of said circuits including a relatively high voltage lamp and low voltage responsive relay means for controlling energization of said lamp.

23. The system of claims 1 or 3, further comprising means for stopping such process when said means for sensing fails to sense the occurrence of an event at an expected position, and detecting means for detecting when said means for stopping has stopped such process.

24. The system of claim 23, said means for stopping comprising contact means for controlling power to continue or to stop such process, and said detecting means comprising opto-isolator means coupled with respect to said contact means for producing an electrical indication of the open or closed condition of said contact means.

25. The system of claim 24, further comprising indicator means operative in response to the electrical indication of said opto-isolator means for visually indicating stoppage of such process.

26. The system of claim 25, said means for visually indicating comprising a light emitting diode for low voltage energization.

27. The system of claim 26, said offset control means comprising adjustable switches.

28. The system of claim 25, said indicator means comprising two circuits connected for simultaneous energization by a common signal to produce normally redundant visual information, one of said circuits including light emitting diode means for low voltage energization, the other of said circuits including a relatively high voltage lamp and low voltage responsive relay means for controlling energization of said lamp.

29. The system of claims 1 or 2, further comprising opto-isolator means for receiving a signal representing whether or not such process is in progress and producing an output signal indicative thereof.

30. The system of claims 1, 4, 9 or 17, further comprising offset control means for controlling said means for sensing to search for each respective event a controlled amount before and after the expected position of such event.

31. The system of claim 1, said progress transducer means comprising means for producing count information representing relative progress of such process in its cycle.

32. The system of claim 31, said progress transducer means comprising means for monitoring the progress of an endless-type conveyor in its cyclical operation.

33. The system of claim 1, said progress transducer means comprising means for producing a signal having a frequency proportional to the speed of such process, and counter means responsive to such signal for developing count information representing relative progress of such process in its cycle.

34. The system of claim 33, further comprising opto-isolator means for coupling said means for producing and said counter means.

35. The system of claims 1 or 33, said progress transducer means comprising means for monitoring the progress of an endless-type conveyor in its cyclical operation.

36. The system of claims 1, 31 or 32, further comprising storage means for storing information concerning the distance between adjacent pairs of events occurring in such process.

37. The system of claim 36, further comprising means responsive to the detecting of the occurrence of an event for extracting from said storage means information concerning the expected position of the following event and means responsive to such extracted information for causing said means for sensing to search for such following event at such expected position.

38. The system of claim 37, further comprising means for stopping such process when said means for sensing fails to sense an event at an expected position.

39. The system of claim 38, further comprising means for restarting such process by causing said means for sensing to assume that the undetected event was detected only in the current cycle of such process.

40. The system of claim 38, further comprising override means for overriding said means for stopping to continue subsequent unmonitored operation of such process.

41. The system of claim 38, further comprising means for preventing said means for sensing from searching for a selected event after said means for stopping has stopped said process by revising the stored information concerning the distance of such event from the preceding event to a combination of such information with the stored information concerning the distance of the following event, said means for preventing including means for restarting such process after such preventing.

42. The system of claim 37, further comprising offset control means for controlling said means for sensing to search for each respective event a controlled amount before and after the expected position of such event.

43. The system of claim 37, further comprising means for updating such stored information concerning each respective pair of events when the latter of each pair is detected by said event transducer means.

44. The system of claim 37, further comprising means for preventing said means for sensing from searching for a selected event by revising the stored information concerning the distance of such event from the preceding event to a combination of such information with the stored information concerning the distance of the following event.

45. The system of claim 36, further comprising selectively operable program control means for starting operation of the monitor system in a program mode to measure, obtain and store such information during one cycle of such process.

46. The system of claim 45, further comprising indicator means for producing a visual indication of operation of the monitor system in a program mode.

47. The system of claim 45, further comprising selectively operable detect control means for terminating operation of the monitor system in such program mode and initiating operation in a detect mode to search for such events at respective positions according to such stored information.

48. The system of claim 47, further comprising indicator means for producing a visual indication of operation of the monitor system in a detect mode.

49. The system of claim 45, further comprising means for inputting information indicative of the number of events in such process and automatic control means operative in response to the storing of such information concerning all of such pairs of adjacent events in such program mode for terminating operation of the monitor system in such program mode and initiating operation in a detect mode to search for such events at respective positions according to such stored information.

50. The system of claims 1 or 4, further comprising means for inputting information indicative of the number of events in such process.

51. The system of claim 50, further comprising display means for displaying the number of events in such process.

52. The system of claim 51, further comprising means for zeroing said display means.

53. The system of claims 1 or 3, said means for sensing comprising a microcomputer.

54. A monitoring system for monitoring the occurrence of a plurality of events in a cyclical process, comprising: event transducer means for detecting the occurrence of such events in such process, progress transducer means for detecting the progress of such process, control means for starting and stopping such process, and computer means for sensing whether respective events occur at expected positions in the progress of such process, said computer means being coupled to said control means to operate the same to stop such process when a prescribed number of events has been missed.

55. The system of claim 54, further comprising diagnostic means for diagnosing failures in the monitoring system and upon diagnosing a failure causing said computer means to operate said control means to stop such process.

56. The system of claim 55, further comprising output means for indicating the occurrence of such a failure.

57. The system of claim 56, said output means including redundant visual indicators, one comprising a light emitting diode and the other comprising a lamp, and further comprising relay means energizable by said computer means in parallel with said light emitting diode for delivering electric power to said lamp to emit light when said light emitting diode emits light.

58. The system of claim 55, said diagnostic means comprising means for sensing a fault in said control means.

59. The system of claim 55, said diagnostic means comprising means for sensing a fault in said progress transducer means.

60. The system of claim 59, said progress transducer means comprising means for producing a train of electrical signals at a frequency proportionally representative of the speed of such process and counter means for counting such electrical signals to produce count information proportionally representative of the progress of such process, said diagnostic means further comprising program control means for said computer means for causing the latter to sense a fault when there is no change in such count value within a predetermined time.

61. The system of claim 55, said diagnostic means comprising means for sensing a fault in said event transducer means.

62. The system of claim 66, said event transducer means comprising transmitter means for producing an electric signal, receiver means for responding to such electric signal when received thereby, and coupling means for coupling said electric signal from said transducer means to said receiver means as an indication of the occurrence of such event, and said means for sensing a fault comprising test means for testing said receiver means by coupling a test signal from said transmitter means to said receiver means and means for coupling said computer means to said test means to control such delivery of such test signal.

63. The system of claim 62, said computer means further comprising program control means for causing said computer means to deliver such test signal when an event is not sensed at its expected position.

64. The system of claim 62, said test means comprising an analog switch coupled between said transmitter means and receiver means.

65. The system of claim 55, said computer means comprising a central processing unit, at least one storage means for storing information indicative of the expected position of each event in such process and status information representative of the operative or inoperative status of plural portions of the monitoring system, and program control means for controlling operation of said central processing unit to operate said storage means for reading and writing information with respect to the same.

66. The system of claim 65, said control means including NOR gate means coupled to receive a plurality of signals from said storage means representative of such status information to stop such process in response to a failure indication by any one of such signals.

67. The system of claim 65, said program control means comprising an EPROM.

68. The system of claim 65, further comprising offset means for controlling said central processing unit to search for selected events a predetermined distance before and after the expected position thereof.

69. The system of claim 54, further comprising input means for delivering input command signals to said computer means to operate said control means to start such process.

70. The system of claim 69, said input means comprising plural switch means for controlling said computer means to operate the monitoring system in plural respective modes of operation.

71. The system of claim 69, said input means further comprising keyboard means for entering into said computer means information concerning the number of events in one complete cycle of such process, and further comprising display means for displaying such number of events.

72. The system of claim 54, such process comprising the movement of an endless type conveyor through continuous cyclical operation thereof, said event transducer means comprising integrity detector means positioned at a fixed location for testing the integrity of such conveyor and producing sequential event signals indicative of such integrity as such conveyor moves.

73. The system of claim 72, said control means comprising a relay means for controlling power to move such conveyor.

74. The system of claim 72, said progress transducer means comprising means for producing a train of electrical signals at a frequency proportionally representative to the speed of such conveyor and counter means for counting such electrical signals to produce count information proportionally representative of the progress of such conveyor as it moves.

75. The system of claim 74, said computer means including storage means for storing information concerning the relative location of each event in such process, and central processing unit means for responding to such event signals to control storage in said storage means of such location information.

76. The system of claim 75, said computer means further comprising program control means for controlling said central processing unit means in response to such an event signal to take the difference between the instant count value and the count value when the immediately preceding event signal was produced and to store such difference in said storage means as information indicative of the relative distance between the positions of adjacent events in such process.

77. The system of claim 76, said program control means, storage means, progress transducer means, and central processing unit means being cooperatively interrelated to cause said central processing unit means selectively to search for an event signal from said event transducer means at least approximately at selected positions on such conveyor.

78. The system of claim 77, said computer means further comprising off-set control means for causing said central processing unit means to search for such event signals a prescribed amount before and after such selected positions on such conveyor.

79. The system of claim 78, said offset control means comprising switch means for producing an offset count for subtraction from and addition to such stored difference in said storage means.

80. The system of claim 54, said computer means including storage means for storing information concerning the relative location of each event in such process, and central processing unit means for controlling said storage means to store such information.

81. The system of claim 80, said computer means further comprising program control means for controlling said central processing unit means upon sensing such an event to calculate the distance information between the immediately sensed event and the immediately preceding event and to store such difference information in said storage means as information indicative of the relative distance between the positions of adjacent events in such process.

82. The system of claim 81, said program control means, storage means, progress transducer means and central processing unit means being cooperatively interrelated to cause said central processing means selectively to search for each event at least approximately at selected positions in the progress of such process.

83. The system of claim 82, said computer means further comprising offset control means for causing said central processing unit means to search for such events a prescribed amount before and after such selected positions in such process.

84. A method for automatically monitoring the occurrence of a plurality of events in a cyclical process, comprising: storing information concerning the expected position of each event in such process, detecting the occurrence of such events in such process, simultaneously detecting the progress of such process, and sensing whether respective events occur at expected positions in the progress of such process.

85. The method of claim 84, said step of storing comprising obtaining distance information concerning the distance between adjacent events and storing such distance information.

86. The method of claim 85, said step of sensing comprising after detecting the occurrence of an event and the position thereof in the progress of such process, determining the expected position of the next event from the stored distance information, and according to the progress of such process checking at least approximately at such expected position to determine whether the occurrence of such next event has been detected.

87. The method of claim 86, said step of checking comprising providing a window on both sides of such expected position and checking for such next event throughout the duration of such window.

88. The method of claim 87, said step of storing comprising updating the distance information between adjacent pairs of events each time an event is detected.

89. The method of claim 86, further comprising controlling such process to continue the same when such next event is so detected and to stop such process when such next event is not so detected.

90. The method of claim 89, further comprising continuing the foregoing steps cyclically as such process continues.

91. The method of claim 90, further comprising after such process has been stopped, restarting such process and monitoring by providing artificial information indicating that the undetected next event had been detected.

92. The method of claim 91, said step of restarting further comprising revising the stored distance information by combining the distance information concerning the distance from the previously detected event to the expected position of the undetected event with the distance information concerning the distance from the expected position of the undetected event to the expected position of the next event, and deleting the latter distance information from storage.

93. The method of claims 91 or 92, said step of restarting further comprising checking the progress of such process to determine whether such process has progressed beyond the next event, and if affirmative, providing such artificial information indicating that such next event had been detected and then considering the still next event as the next event.

94. The method of claim 89, further comprising indicating visually whether such process is continuing or stopped.

95. The method of claim 84, further comprising indicating visually the detecting of each event.

96. The method of claim 84, wherein an event transducer is used for detecting the occurrence of such events and a progress transducer is used for detecting the progress of such process, the method further comprising checking the operational integrity of such event transducer and progress transducer, and stopping such process upon finding a fault in the operational integrity thereof.

97. The method of claim 96, wherein a microcomputer is used for sensing whether respective events occur at expected positions, the method further comprising checking the operational integrity of such microcomputer, and stopping such process upon finding a fault in the operational integrity thereof.

98. The method of claim 97, further comprising indicating visually the nature of any such fault.

99. The method of claim 84, said step of storing comprising, before sensing whether respective events occur at expected positions, obtaining information concerning the position of each event, said obtaining including for each pair of adjacent events in such process on the basis of progress information concerning the progress of such process when each of such pair of adjacent events has been detected obtaining distance information concerning the distance between such pair of adjacent events, and storing distance information concerning the distance between each pair of adjacent events in one complete cycle of such process.

100. The method of claim 99, said step of obtaining information concerning the position of each event comprising selectively operating such process through one complete cycle without such sensing step, and thereafter causing such step of sensing to occur.

101. The method of claim 99, said step of obtaining information concerning the position of each event comprising inputting information concerning the number of events in one complete cycle of such process, and automatically operating such process through one complete cycle to obtain and to store such distance information between each pair of adjacent events, including the pair of events that includes the last and first events, and then automatically causing such sensing steps to occur.

102. The method of claim 84, said step of detecting the progress comprising producing a train of electrical pulses at a frequency proportionally representative of the speed of such process, and counting such electrical pulses to provide count information indicative of the progress of such process.

103. The method of claim 102, said step of storing comprising obtaining a difference count by calculating the difference of the count information when one event is detected and the count information when the immediately preceding event was detected, and storing such difference count as a representation of the distance between such pair of events.

104. The method of claim 103, wherein any pair of adjacent events may be considered the first and last events in such process and wherein before commencing said step of sensing, information concerning the distance between each pair of adjacent events, including the distance between the last and the first events, during one complete cycle of such process is stored, and thereafter controlling such step of sensing to effect the same in response to such stored information and the instant count information which represents the instant progress of such process.

105. The method of claim 104, said step of controlling comprising reading the count information upon detecting the occurrence of an event, retrieving from storage the difference count representing the expected distance to the next event, combining such count information and difference count to obtain an expected count, comparing the instant count information with such difference count, and commencing such sensing at least approximately when such difference count and instant count information are equal.

106. The method of claim 105, further comprising modifying such difference count by an offset amount to obtain an offset count and causing such sensing to begin when such instant count information equals such offset count.

107. The method of claim 105, further comprising determining a window during which said sensing occurs before and after the expected position of each event.

108. The method of claim 105, further comprising controlling such process to continue the same when such next event is so detected and to stop such process such such next event is not so detected.

109. The method of claim 84, said step of detecting the occurrence of such events comprising coupling an electrical signal from a transmitter to a receiver upon the successful occurrence of each event.

110. The method of claim 109, further comprising checking the operability of such receiver by selectively passing thereto a signal from such transmitter and simultaneously monitoring the output of such receiver.

111. The method of claim 110, said step of checking comprising checking such receiver whenever during said sensing step an event is undetected at an expected location, and upon finding an inoperable receiver, stopping such process and indicating such inoperability.

112. The method of claim 110, said step of checking comprising checking such receiver whenever during said sensing step an event is undetected at an expected location, and upon finding an operable receiver, stopping such process and indicating that an event was undetected at an expected position therefor.

113. The method of claim 84, wherein such process is the operation of an endless type conveyor belt, and said step of detecting the occurrence comprises checking specified portions of such conveyor belt as they pass a rip detector station to find a rip in the conveyor belt, whereby an undetected event at its expected position during said sensing step may be interpreted as a rip in the conveyor belt.

114. The method of claim 113, further comprising stopping said conveyor belt when a rip is found.

115. A method for monitoring a cyclical process by checking the occurrence of a plurality of selected events at expected positions thereof in the course of such process, comprising: obtaining information concerning the relative positions of such events, monitoring such process to observe whether each event occurs at its expected position, and, as each event is detected, updating its relative position information.

116. The method of claim 115, said step of monitoring such process comprising allowing a window of error within which to find each event before and after its expected position in such process.

117. The method of claim 115, further comprising stopping such process when an event is undetected at its expected position, and restarting such process by providing artificial information to represent that such undetected event was detected and deleting the information concerning the expected position of such event, whereby in subsequent monitoring steps the presence of such event is not observed.

118. The method of claim 115, said step of obtaining information comprising operating such process through one complete cycle thereof and sensing and storing information concerning the position of each event in such process.

* * * * *